United States Patent
Hori et al.

(10) Patent No.: US 7,639,493 B2
(45) Date of Patent: Dec. 29, 2009

(54) STORAGE CONTROL DEVICE

(75) Inventors: Masanori Hori, Odawara (JP); Masahiko Sato, Odawara (JP); Akihito Yamanashi, Oyama (JP)

(73) Assignee: Hitachi, Ltd., Tokyo (JP)

( * ) Notice: Subject to any disclaimer, the term of this patent is extended or adjusted under 35 U.S.C. 154(b) by 291 days.

(21) Appl. No.: 11/605,395

(22) Filed: Nov. 29, 2006

(65) Prior Publication Data

US 2008/0080131 A1 Apr. 3, 2008

(30) Foreign Application Priority Data

Sep. 29, 2006 (JP) .............................. 2006-267135

(51) Int. Cl.
*H05K 5/00* (2006.01)
*G11B 17/00* (2006.01)

(52) U.S. Cl. ...................................... 361/679.4; 360/69

(58) Field of Classification Search ................. 361/683, 361/684, 685, 686; 395/822; 360/69, 73.03; 711/114; 713/300; 369/75.11
See application file for complete search history.

(56) References Cited

U.S. PATENT DOCUMENTS

| | | | |
|---|---|---|---|
| 5,784,641 A * | 7/1998 | Sueyoshi et al. ............... 710/2 |
| 5,835,780 A * | 11/1998 | Osaki et al. .................. 713/300 |
| 6,012,124 A * | 1/2000 | Kamo et al. .................. 711/114 |
| 6,583,947 B1 | 6/2003 | Hakamata et al. |
| 6,826,005 B2 * | 11/2004 | Hakamata et al. ............. 360/69 |
| 6,970,349 B2 * | 11/2005 | Szolyga ................... 361/679.31 |
| 2003/0217300 A1 * | 11/2003 | Fukumori et al. ........... 713/300 |
| 2004/0078663 A1 * | 4/2004 | Inaba ........................... 714/22 |
| 2004/0193791 A1 * | 9/2004 | Felton et al. ................. 711/112 |
| 2006/0193073 A1 * | 8/2006 | Hakamata et al. ............. 360/69 |

FOREIGN PATENT DOCUMENTS

| JP | 2000-293314 | 4/1999 |
|---|---|---|
| JP | 2001-339853 | 5/2000 |

* cited by examiner

*Primary Examiner*—Chandrika Prasad
(74) *Attorney, Agent, or Firm*—Stites & Harbison PLLC; Juan Carlos A. Marquez, Esq.

(57) ABSTRACT

The storage control device of the present invention reduces power consumption by stopping the flow of power to enclosures that are not being accessed. A plurality of additional enclosures are connected to a base enclosure by means of a daisy-chain connection. The respective additional enclosures are divided into three levels, namely a low usage frequency level, a medium usage frequency level, and a high usage frequency level depending on the connection distance of the additional enclosures from the base enclosure. Drives that have not been accessed for a predetermined time are spun down. When all the drives in the enclosure are in the spin down state, the supply of power from the power supply to the respective drives is stopped. Further, when the flow of power to an additional enclosure located below the enclosure itself has stopped, the switch of the latter enclosure is turned OFF and the flow of power to the additional enclosure is stopped.

12 Claims, 33 Drawing Sheets

FIG. 12

| | | | VOLUME MANAGEMENT TABLE | | T1 |
|---|---|---|---|---|---|
| I11 | I12 | I13 | I14 | I15 | I16 |
| LU# | CAPACITY | RAID GROUP # | RAID LEVEL | DRIVE# LIST | LATEST ACCESS TIME |
| LU#0 | 200MB | RG01 | RAID5 | HDD01,02,03,04 | 2006/09/25 12:00:00 |
| ... | ... | ... | ... | ... | ... |

FIG. 13

POWER SUPPLY STATE MANAGEMENT TABLE    T2

| ENCLOSURE # (121) | STATE OF POWER SUPPLY TO ENCLOSURE (122) | DRIVE# (123) | SPIN STATE (124) | FIRST PDB SW# (125) | SW STATE (126) | SECOND PDB SW# (127) | SW STATE (128) |
|---|---|---|---|---|---|---|---|
| #0 | ON | HDD00 | ON | 01-0 | ON | 11-0 | ON |
|  |  | HDD01 | ON |  |  |  |  |
|  |  | HDD02 | ON |  |  |  |  |
|  |  | ... | ... |  |  |  |  |
|  |  | HDD14 | ON |  |  |  |  |
| #1 | ON | HDD00 | ON | 01-1 | ON | 11-1 | ON |
|  |  | HDD01 | OFF |  |  |  |  |
|  |  | HDD02 | ON |  |  |  |  |
|  |  | ... | ... |  |  |  |  |
|  |  | HDD14 | ON |  |  |  |  |
| #2 | ON | HDD00 | ON | 01-2 | ON | 11-2 | ON |
|  |  | HDD01 | OFF |  |  |  |  |
|  |  | HDD02 | ON |  |  |  |  |
|  |  | ... | ... |  |  |  |  |
|  |  | HDD14 | ON |  |  |  |  |
| #3 | ON | HDD00 | ON | 01-3 | ON | 11-4 | ON |
|  |  | HDD01 | OFF |  |  |  |  |
|  |  | HDD02 | ON |  |  |  |  |
|  |  | ... | ... |  |  |  |  |
|  |  | HDD14 | ON |  |  |  |  |
| ... | | | | | | | |

STORAGE CONTROL DEVICE

CROSS-REFERENCE TO RELATED APPLICATIONS

This application relates to and claims priority from Japanese Patent Application No. 2006-267135 filed on Sep. 29, 2006, the entire disclosure of which is incorporated herein by reference.

BACKGROUND OF THE INVENTION

1. Field of the Invention

The present invention relates to a storage control device.

2. Description of the Related Art

The storage control device comprises a storage section obtained by connected a multiplicity of hard disk drives in the form of an array and provides a host computer such as a server ('host' hereinbelow) with a logical storage region (logical volume). In order to improve reliability, the storage control device provides the host with a RAID (Redundant Array of Independent Disks)-based redundant storage region.

Further, the data to be managed by an enterprise or the like grows day by day. Hence, a storage control device capable of increasing the storage capacity in accordance with the increase in the amount of data is preferable. Therefore, a storage control device that is able to provide a storage region that matches the user's needs by connecting a plurality of additional enclosures that provide storage regions to the base enclosure governing the control function has been proposed (Japanese Patent Application Laid Open No. 2001-339853).

In the conventional technology appearing in Japanese Patent Application Laid Open No. 2001-339853, the start or stoppage of the power supply to the base enclosure and the start or stoppage of the power supply to each additional enclosure are made to work together. As a result, when the storage control device is stopped completely, the whole of the power supplied to the respective enclosures can be automatically stopped simply by stopping the power supply to the base enclosure.

In further conventional technology that appears in Japanese Application Laid Open No. 2000-293314, the respective magnetic disk devices that constitute a RAID group are shifted to power conservation mode.

In the conventional technology that appears in Japanese Patent Application Laid Open No. 2001-339853, the power supply operation to the base enclosure and the power supply operation of each additional enclosure are made to work together but the results are limited from the perspective of reducing the power consumption of the storage control device.

On the other hand, in the case of the conventional technology that appears in Japanese Application Laid Open No. 2000-293314, the power consumption of the storage control device can be reduced because the magnetic disk devices which cannot be accessed at fixed intervals are shifted to power conservation mode.

However, in the case of the conventional technology that appears in Japanese Application Laid Open No. 2000-293314, the power consumption amount of the respective magnetic disk devices constituting the RAID group remains curtailed and there is scope for additional improvement. That is, even when the respective magnetic disk devices are moved to power conservation mode, power is supplied to the control circuit section and cooling fan in the enclosure and to the power supply circuit and the operation is continued. Hence, there is scope for improvement in the power consumption of each section other than the magnetic disk device.

SUMMARY OF THE INVENTION

The present invention was conceived in view of the above problem and an object of the present invention is to provide a storage control device constituted such that the power consumption amount can be further reduced by supplying power or stopping power in enclosure units. A further object of the present invention is to provide a storage control device capable of implementing energy savings in enclosure units while maintaining a signal transmission function when each enclosure is connected to the daisy chain. Further objects of the present invention will become evident from the following description of the embodiments.

In order to solve the above problem, in a storage control device that comprises a plurality of enclosures according to one aspect of the present invention, any one of the enclosures is a first enclosure for controlling data communications to and from a higher level device and the operation of the other enclosures; the other enclosures other than the first enclosure among the enclosures are second enclosures each comprising a plurality of storage devices. Further, the first enclosure holds system constitution information for managing the constitution of the storage control device and the power supply state and controls the supply or stoppage of power individually to each of the second enclosures on the basis of system constitution information.

The first enclosure may shift a storage device that has not been accessed for a preset predetermined time or more from among the respective storage devices to a power conservation mode that suppresses power consumption.

When a predetermined second enclosure for which all the storage devices in the enclosure have shifted to the power conservation mode is detected among the respective second enclosures, the first enclosure may stop the supply of power to all of the storage devices in the predetermined second enclosure.

When a predetermined second enclosure for which all the storage devices in the enclosure have shifted to the power conservation mode is detected among the respective second enclosures, the first enclosure may stop the supply of power to the predetermined second enclosure.

The first enclosure may stop the supply of power to the predetermined second enclosure after stopping the supply of power to all the storage devices in the predetermined second enclosure.

In the embodiment of the present invention, the first enclosure and the respective second enclosures are connected by means of a daisy-chain connection; and the first enclosure stops the supply of power to the second enclosures either in a case where it is judged that the supply of power to the other second enclosures located downstream of the predetermined second enclosure has stopped or in a case where it is judged that the predetermined second enclosure is located at the end of the connection, after stopping the supply of power to all of the storage devices in the predetermined second enclosure.

The first enclosure is also able to store data for which the usage frequency by the higher level device is equal to or less than a predetermined value that has been preset in the storage devices in the respective second enclosures in order starting with the enclosures for which the connection distance from the first enclosure is long.

Storage devices with a relatively low performance may be used as the respective storage devices of second enclosures that have a large connection distance from the first enclosure among the respective second enclosures, and storage devices with a relatively high performance may be used as the respective storage devices of second enclosures for which the connection distance from the first enclosure is short.

In the embodiment of the present invention, the first enclosure and each of the second enclosures are connected by means of a daisy chain connection and the first enclosure stops the supply of power to other functions other than the functions required for the predetermined second enclosure to transmit a signal when the transmission of a signal to the predetermined second enclosure is required, after stopping the supply of power to all of the storage devices in the predetermined second enclosure.

When power is supplied to a plurality of the second enclosures for each of which the power supply has stopped, the first enclosure supplies power with a time difference to the plurality of second enclosures.

The first enclosure may also diagnose whether the second enclosures for which the supply of power has been stopped are working properly by supplying power at regular or irregular intervals to the second enclosures.

A storage control device comprising a plurality of enclosures according to another aspect of the present invention comprises a first enclosure; second enclosures each comprising a plurality of storage devices; and a power supply circuit section for supplying external power to the first enclosure and to each of the second enclosures respectively. The first enclosure at least comprises: a system constitution information management section that manages system constitution information relating to the constitution of the storage control device and to the power supply state; a first control section that processes the power supply to each of the second enclosures and data inputs and outputs between a higher level device and each of the storage devices on the basis of the system constitution information managed by the system constitution information management section; and a first enclosure internal power supply section that supplies predetermined power to the first control section by converting the external power supply supplied via the power supply circuit section into a predetermined voltage. Each of the second enclosures at least comprises: a plurality of the storage devices that store data used by the higher level device; a second control section that controls the data inputs and outputs with respect to the respective storage devices and the operation of the second enclosure power supply section in accordance with an instruction from the first control section; and a second enclosure internal power supply section that supplies power to the respective storage devices and the second control section by converting the external power supply supplied via the power supply circuit section in to a predetermined voltage. The power supply circuit section comprises switch sections that are each provided midway along the power supply path between at least the respective second enclosure internal power supply section and the external power supply, the switch sections being made to open or close each of the power supply paths in accordance with the instruction from the first control section. The first control section closes the power supply path between the external power supply and the second enclosure internal power supply section of the predetermined second enclosure by operating the switch section connected to the predetermined second enclosure for a predetermined second enclosure among the respective second enclosures for which it is judged that access to the respective storage devices that exist in the second enclosure is unnecessary, based on the system constitution information.

In the embodiment of the present invention, the first enclosure and the respective second enclosures are connected by means of a daisy chain connection, and the first control section is capable of executing each of: (1) a first mode in which storage devices among the respective storage devices that have not been accessed for a preset predetermined time or more are shifted to a power conservation mode that suppresses power consumption; (2) a second mode in which, when a predetermined second enclosure among the respective second enclosures for which all the storage devices in the enclosure have shifted to the power conservation mode is detected, the supply of power to all of the storage devices in the predetermined second enclosure is stopped; and (3) a third mode in which the supply of power to the predetermined second enclosure is stopped after stopping the supply of power to all of the storage devices in the predetermined second enclosure.

BRIEF DESCRIPTION OF THE DRAWINGS

FIG. 12 is an explanatory diagram that shows a table for managing volumes;

FIG. 13 is an explanatory diagram that shows a table for managing power supply states;

DESCRIPTION OF THE PREFERRED EMBODIMENTS

Figure 1:
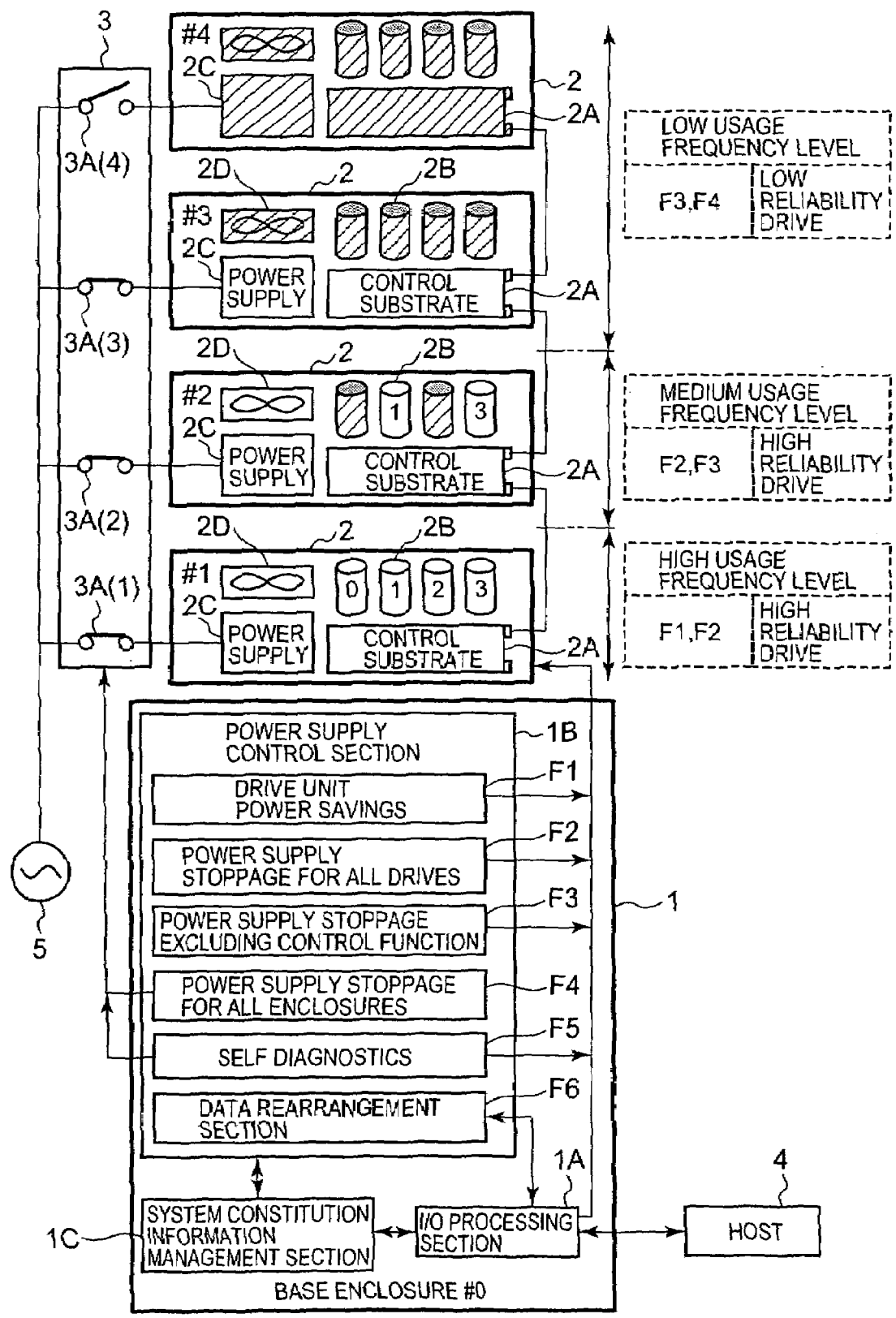
FIG. 1 is an explanatory diagram of the concept of an embodiment of the present invention.

Embodiments of the present invention will be described hereinbelow on the basis of the drawings. FIG. 1 is an explanatory diagram that shows an overview of the storage control device according to this embodiment.

The storage control device is constituted, for example, by arranging enclosures 1 and 2 of a plurality of types. One type of enclosure is the base enclosure 1 and the other type of enclosure is the additional enclosure 2. The base enclosure 1 corresponds to the first enclosure and additional enclosure 2 corresponds to the second enclosure. Base enclosure 1 and additional enclosures 2 are connected by means of a daisy chain connection. That is, the transmission of data between the base enclosure 1 and each of the additional enclosures 2 is performed sequentially via the adjoining enclosures.

The base enclosure 1 is an enclosure that governs the control off the whole storage control device and is connected to a host 4 constituting the host device and to each additional enclosure 2. The base enclosure 1 accesses disk drives 2B in the additional enclosures 2 and reads and writes data therefrom/thereto in accordance with commands issued by the host 4.

The base enclosure 1 is constituted comprising, for example, an I/O processing section 1A, a power supply control section 1B, and a system constitution information management section 1C. Further, as will also be clear from the subsequent embodiment, the base enclosure 1 can also comprise a disk drive.

The I/O processing section 1A writes data or reads data by accessing the disk drive 2B in each additional enclosure 2 on the basis of commands issued by the host 4.

The power supply control section 1B is one of the control functions that the base enclosure 1 comprises and controls the supply or stoppage of power pertaining to each additional enclosure 2. The power supply control section 1B can also execute a plurality of types of power saving modes F1 to F4 with the respective timing.

In mode F1, which implements drive-unit power savings, power savings for each drive are implemented by stopping the supply of power to the motor of the disk drives 2B that are not accessed at regular intervals and by stopping a portion of the electronic circuit, for example.

In mode F2, which stops the supply of power to all the drives, power savings are implemented for all the disk drives in the enclosure by stopping the supply of power to all the disk drives 2B that are provided in the same enclosure.

In power halt mode F3, which excludes a control function, additional power savings are implemented by stopping the supply of power to functions other than a control function that is implemented by a control substrate 2A provided in the additional enclosure 2. In this mode F3, only the control function of the additional enclosure 2 is maintained and other functions are stopped. Control functions can include a function that receives instructions from the base enclosure 1 and which transmits the instructions to other additional enclosures 2, for example. In mode F3, when the control substrate 2A is able to partially operate the signal transmission function, it is possible to stop the supply of power to circuits other than the circuits required to implement the signal transmission function among the circuits of the control substrate 2A. Furthermore, in mode F3, the function for controlling the operation of a cooling fan 2D among the various functions of the control substrate 2A, for example, can also be stopped. However, when the implementation of the cooling function by the cooling fan 2D, for example, is preferably a normal operation of the control substrate 2A, the supply of power to the cooling fan 2D can be continued in mode F3. That is, in mode F3, power is supplied only to the signal transmission function and the other functions that support this function and the supply of power to the other respective functions is stopped.

In mode F4, which stops the supply of power to the whole enclosure, the supply of power from an external power supply 5 to the additional enclosures 2 is stopped by opening switches 3A of a power supply circuit section 3. In this mode F4, the respective functions of the additional enclosure 2 are stopped and the power saving effect is maximized.

The power supply control section 1B comprises a self-diagnostic mode F5. In self-diagnostic mode F5, through the supply of power at regular or irregular intervals to the additional enclosures 2 for which the supply of power to the whole enclosure has stopped, it is diagnosed whether the additional enclosure 2 are operating normally.

The power supply control section 1B comprises a data rearrangement section F6. The data rearrangement section F6 controls the storage destination of data stored in each disk drive 2B in each additional enclosure 2 on the basis of the usage status from the host 4. In other words, the data rearrangement section F6 executes data migration so that, as the usage frequency rises, the data rearrangement section F6 positions the data in additional enclosures 2 closer to the base enclosure 1 and, as the usage frequency falls, the data rearrangement section F6 positions the data in additional enclosures 2 further from the base enclosure 1. Here, in a constitution with a daisy chain connection, a position close to the base enclosure 1 or far from the base enclosure 1 signifies that the physical distance of the connection is short or long.

The system constitution information management section 1C stores and manages information pertaining to the system constitution of the storage control device. Information pertaining to the system constitution can include, for example, information pertaining to the arrangement of the disk drives 2B, information pertaining to the constitution of the RAID group or logical volumes and information relating to the constitution of the connection between the additional enclosure 2 and the power supply circuit section 3. In this embodiment, all the constitutional information relating to the storage control device is managed centrally by the base enclosure 1. The power supply control section 1B stops the supply of power to its own additional enclosure 2 by referencing the system constitution information.

The power supply circuit section 3 is a circuit for dividing A/C power from the external power supply 5 between each of the enclosures 1 and 2, for example. Here, although the division of the power supply to the base enclosure 1 is omitted, the external power supply 5 and base enclosure 1 are connected via the power supply circuit section 3 as will be evident from the subsequent embodiments.

The power supply circuit section 3 comprises switches 3A that connect the respective additional enclosures 2 and the external power supply 5. Hence, when the power supply to the intended additional enclosure 2 is stopped, the switch 3A connected to the additional enclosure 2 is opened. As a result, the path of the power supply from the external power supply 5 to the intended additional enclosure 2 is broken.

The power supply circuit section 3 can be constituted as a circuit substrate that is separate from each of the enclosures 1 and 2 but is not limited to such a constitution. The power supply circuit section 3 can also be provided in each of the enclosures 1 and 2. That is, the constitution may be such that the switches 3A are provided in the respective additional enclosures 2, for example.

The respective enclosures 2 are constituted comprising a control substrate 2A, a plurality of the disk drives 2B, a power supply section 2C, and the cooling fan 2D, for example. The control substrate 2A inputs and outputs data with respect to the disk drives 2B on the basis of instructions from the base enclosure 1. Further, the control substrate 2A transmits the instructions from the base enclosure 1 to the control substrates 2A of other adjacent additional enclosures 2.

The disk drive 2B corresponds to a storage device. Here, the disk drive 2B is suitably called a disk drive and may be a storage device that uses a medium other than a disk. As the disk drive 2B, a hard disk drive, a semiconductor memory device, a flash memory device, an optical disk drive, a magneto-optical disk drive, and a magnetic tape device or the like can be used, for example.

The power supply section 2C corresponds to an in-enclosure power supply section. The in-enclosure power supply section 2C converts A/C power that is input from the external power supply 5 via the power supply circuit section 3 into DC power with a predetermined voltage and supplies the DC power to the control substrate 2A, the respective disk drives 2B and the cooling fan 2D. The power supply section 2C is able to output voltages of a plurality of types. Further, the external power supply 5 is not limited to A/C power and may also supply DC power. As will become evident from the subsequent embodiments, the power supply section 2C can be constituted capable of stopping the supply of power to each disk drive 2B in accordance with an instruction from the control substrate 2A.

The cooling fan 2D causes cooling by guiding a cool air stream inside the additional enclosure 2. The cooling fan 2D is operated by a signal from the control substrate 2A. That is, the control substrate 2A is able to start and stop the operation of the cooling fan 2D and control the fan speed of the cooling fan 2D, for example. Further, although the cooling fan 2D was cited as the air-cooling mechanism, the additional enclosure 2 may also be constituted comprising a water-cooling mechanism. In the case of a water-cooling mechanism, the power consumption amount of the additional enclosure 2 is curtailed by controlling the operation of a cooling water recirculation pump or heat exchanger fan, for example.

As shown on the right side of FIG. 1, data from the host 4 with a relatively high usage frequency are disposed in an additional enclosure 2 (#1) that is a short connection distance from the base enclosure 1. The additional enclosure 2 (#1) forms a high usage frequency level. A highly reliable drive is used as the high usage frequency level. A highly reliable drive is a highly reliable disk drive such as an FC (Fibre Channel) disk, for example. Each disk drive 2B of the high usage frequency level additional enclosure 2 (#1) has a high usage frequency and, therefore, mode F1 or mode F2 is used relatively often.

Data of a relatively small usage frequency from the host 4 are disposed in additional enclosures 2 (#3, #4) a long connection distance from the base enclosure 1. The enclosures 2 (#3, #4) form a low usage frequency level. Data of a small usage frequency can include, for example, archive data or backup data or the like. A drive of low reliability is employed as the low usage frequency level. A drive of low reliability is a low-function disk drive such as a SATA (Serial AT Attachment) disk, for example. The respective disk drives 2B of the additional enclosures 2 (#3, #4) of the low usage frequency level have a low usage frequency and modes F3 and F4 are employed relatively often.

Data of medium usage frequency from the host 4 are disposed in an additional enclosure 2 (#2) that is spaced apart by a medium connection distance from the base enclosure 1. The additional enclosure 2 (#2) forms a medium usage frequency level. Either a highly reliably drive or a low reliability drive or a drive of medium reliability, for example, is employed as the medium usage frequency level. The medium usage frequency level additional enclosure 2 (#2) has a medium usage frequency by the host 4 and, therefore, mode F2 or mode F3 is used relatively often.

In this embodiment, a case where the respective additional enclosures 2 that are daisy-chain connected to the base enclosure 1 are divided into three levels, namely, a low usage frequency level, medium usage frequency level, and high usage frequency level was illustrated. The present invention is not limited to this number of levels and may also be constituted divided into two levels, namely a low usage frequency level and a high usage frequency level, or may be constituted provided with four or more levels.

As shown in FIG. 1, in the additional enclosure 2 (#1), power is supplied to each part. In additional enclosure 2 (#2), mode F1 is applied to the disk drives 2B that have not been accessed for a predetermined time or more. In the case of the disk drives 2B that have not been accessed for a predetermined time or more, the speed of the spindle motor is stopped or reduced and part of the electronic circuit is stopped, for example.

Mode F3 is applied to additional enclosure 2 (#3). In other words, power to the respective disk drives 2B and the cooling fan 2D excluding the control substrate 2A is stopped. Mode F4 is applied in the case of additional enclosure 2 (#4). In this mode, switch 3A(4) is open and the path for the power supply between the external power supply 5 and additional enclosure 2 (#4) is shut off. Hence, the power supply to the additional enclosure 2 (#4) is stopped.

The respective enclosures 1 and 2 are connected by means of a daisy chain connection. Hence, in order to maintain signal transmission between the respective enclosures 1 and 2, mode F4 is applied in order starting with the additional enclosure 2 that is a long connection distance from the base enclosure 1. This does not mean that the additional enclosure 2 to which either mode F2 or mode F3 is applied is immediately shifted unconditionally to mode F4. Rather, the additional enclosure 2 can be shifted to mode F4 only when the final-stage additional enclosure 2 stops functioning (when mode F4 is applied).

The storage control device of this embodiment makes the sequential transition from mode F1 to mode F2 and then to mode F3 and mode F4, for example. However, this does not mean that the storage control device necessarily makes such transitions. Rather, sometimes the storage control device moves from mode F3 to mode F1 or from mode F2 to mode F1, for example, depending on the conditions of use by the host 4.

By placing data with a low usage frequency in the additional enclosures 2 (#3, #4) a long connection distance from the base enclosure 1, the probability of mode F4 being applied to the additional enclosures 2 (#3, #4) with a long connection distance can be improved. As a result, the power consumption of the whole storage control device can be reduced beyond that of the prior art by stopping the supply of power to the additional enclosures 2 (#3, #4).

Furthermore, because a low reliability drive is used in the additional enclosures 2 (#3, #4) to which mode F4 is applied, the lifespan of the low-reliability disk drives 2B can be extended and the difference between the lifespan of the low-reliability disk drives 2B and that of high-reliability drives can also be minimized. In the case of low-reliability drives, because the lifespan is often established by the cumulative operating hours, the lifespan can be extended by shortening the operating hours. As a result, the exchange periods of the high-reliability drives and low-reliability drives can be substantially matched and the work efficiency of the maintenance work can be improved.

In this embodiment, power is supplied at regular or irregular intervals to the additional enclosures 2 to which the supply of power has been stopped and a diagnosis of whether the additional enclosures 2 are working normally is performed. Therefore, while checking the reliability of the additional enclosures 2 that have been stopped for a long time, the power consumption of the whole storage control device can be reduced. The storage control device of this embodiment will be described in detail hereinbelow.

First Embodiment

Figure 2:
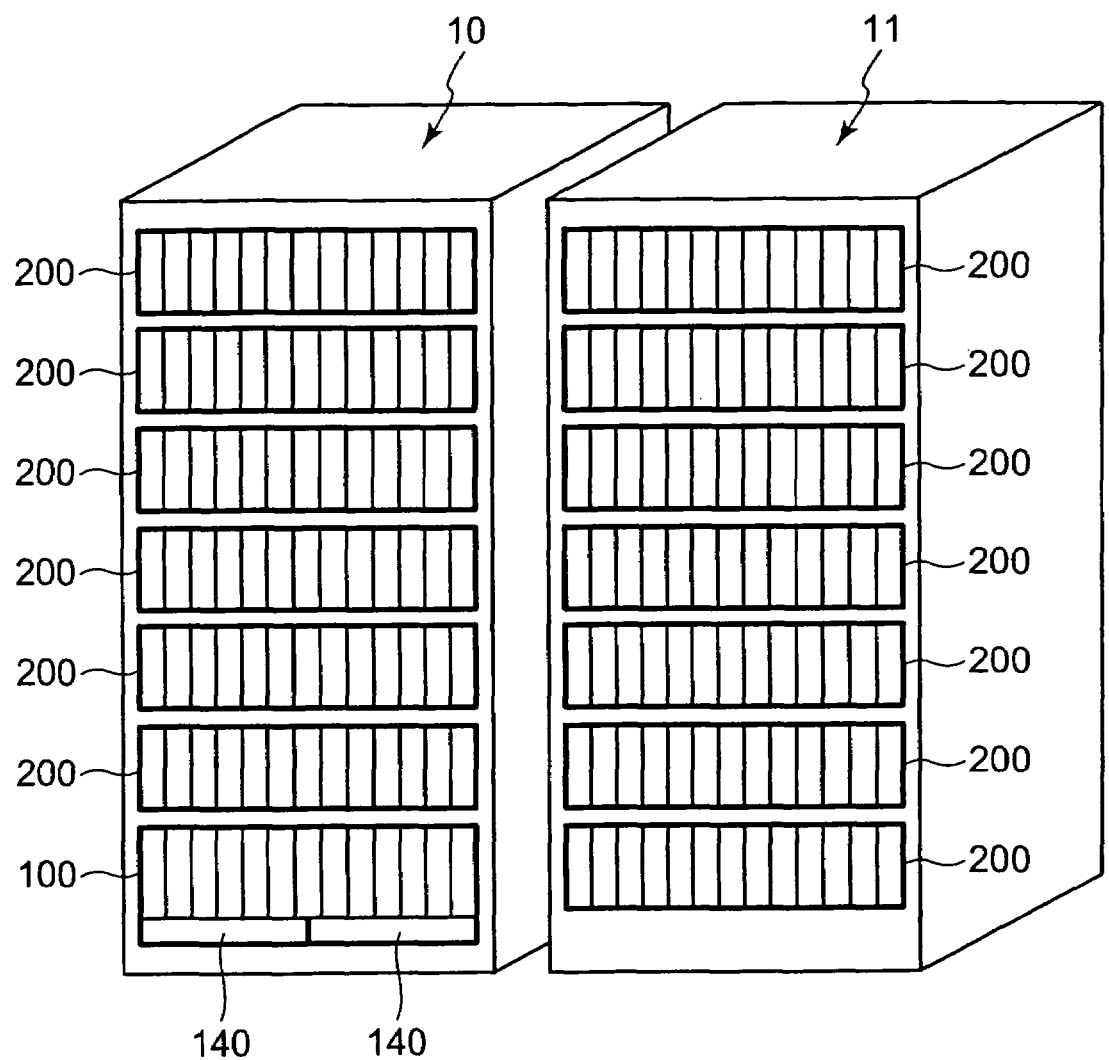
FIG. 2 is a perspective view of the appearance of the storage control device.

FIG. 2 is a perspective view of the external constitution of the storage control device. The storage control device is constituted by connecting a base rack 10 and an additional rack 11 by means of a cable, for example. The base rack 10 comprises a base enclosure 100 and a plurality of additional enclosures 200. The base rack 10 has the smallest constitution of the storage control device and the functions of the storage control device can be implemented using only the base rack 10. The additional rack 11 comprises a plurality of additional enclosures 200. When the storage capacity of the base rack 10 is depleted, the storage capacity can be increased by connecting the additional rack 11 to the base rack 10.

Figure 3:
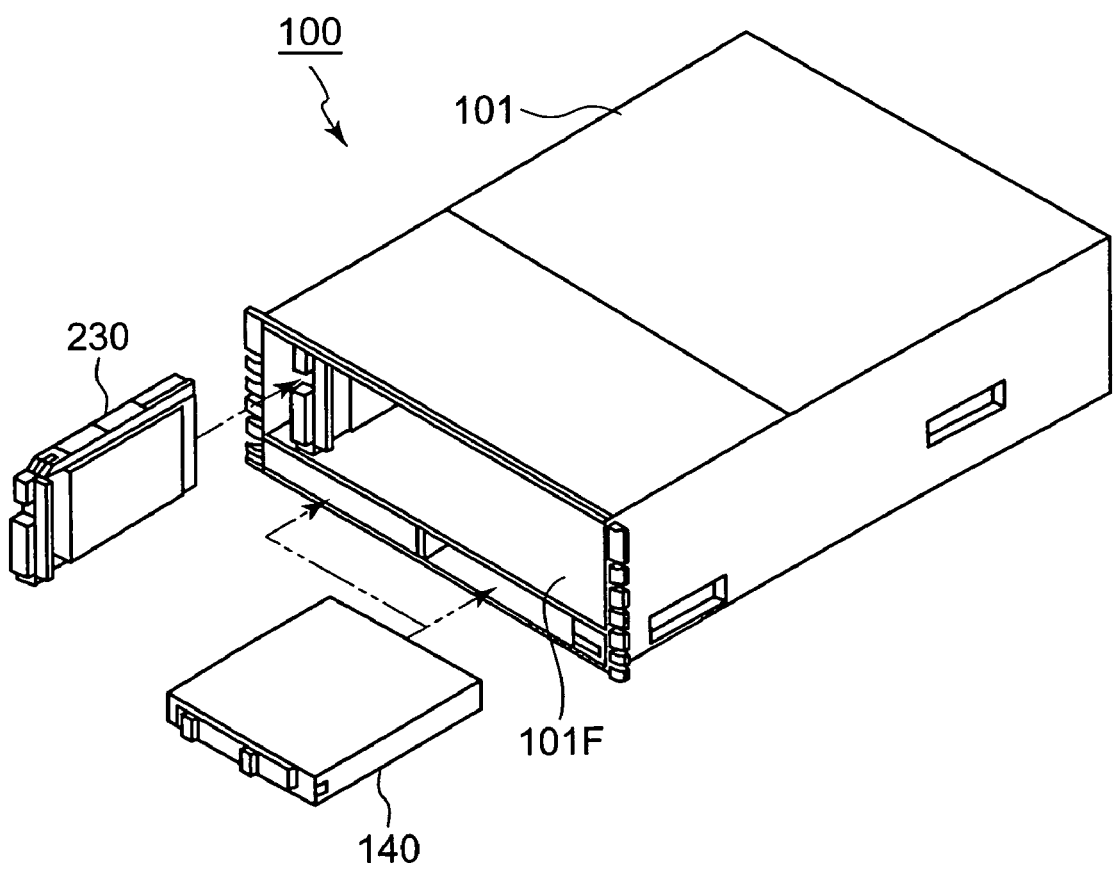
FIG. 3 is a perspective view of a base enclosure as seen from the front side.

FIG. 3 is a perspective view of the base enclosure 100 as seen from the front side. A plurality of batteries 140 and a plurality of disk drives 230 are provided in the casing 101 of the base enclosure 100, at the front side 101F. The base enclosure 100 may have a constitution that comprises disk drives 230 or may have a constitution that does not comprise the disk drives 230. When the base enclosure 100 does not comprise the disk drives 230, predetermined locations of the front side 101F have other constituent parts such as batteries mounted thereon or are covered by facing plates.

Figure 4:
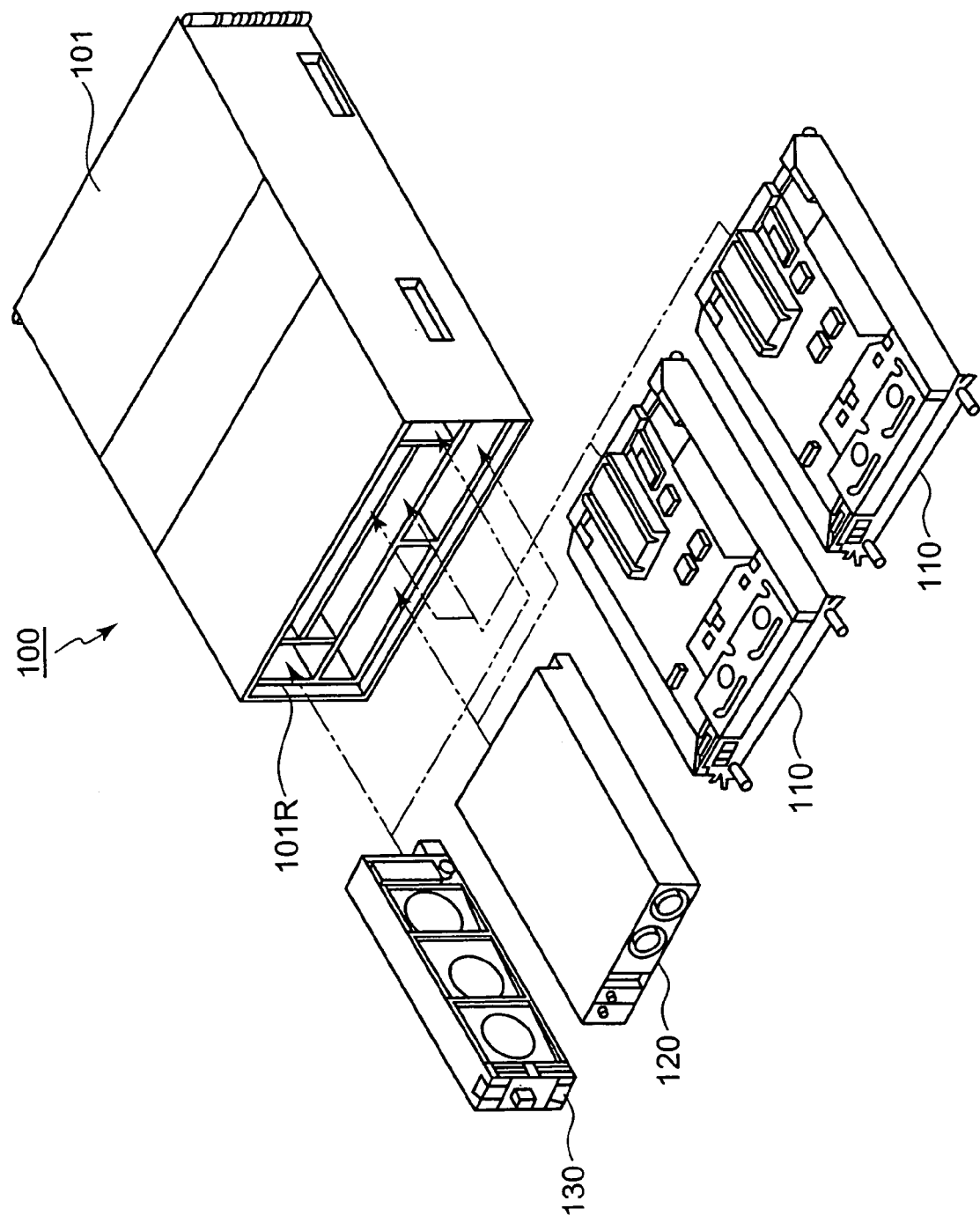
FIG. 4 is a perspective view of the base enclosure as seen from the rear side.

FIG. 4 is a perspective view of the base enclosure 100 as seen from the rear side. The rear side 101R of the casing 101 has, for example, a plurality of controllers 110, a plurality of AC/DC supply sections 120, and a plurality of cooling fans 130 attached thereto. The cooling fans 130 are constituted as a fan assembly in which a plurality of fans are integrated and are disposed on both the left and right sides of the casing 101. The controllers 110 are arranged vertically in the center of the casing 101. The AC/DC supply sections 120 are arranged laterally at the bottom of the casing 101. The same is true in the following description of the additional enclosure 200. However, the constitutions of the base enclosure 100 and additional enclosures 200 are not limited to those illustrated.

Figure 5:
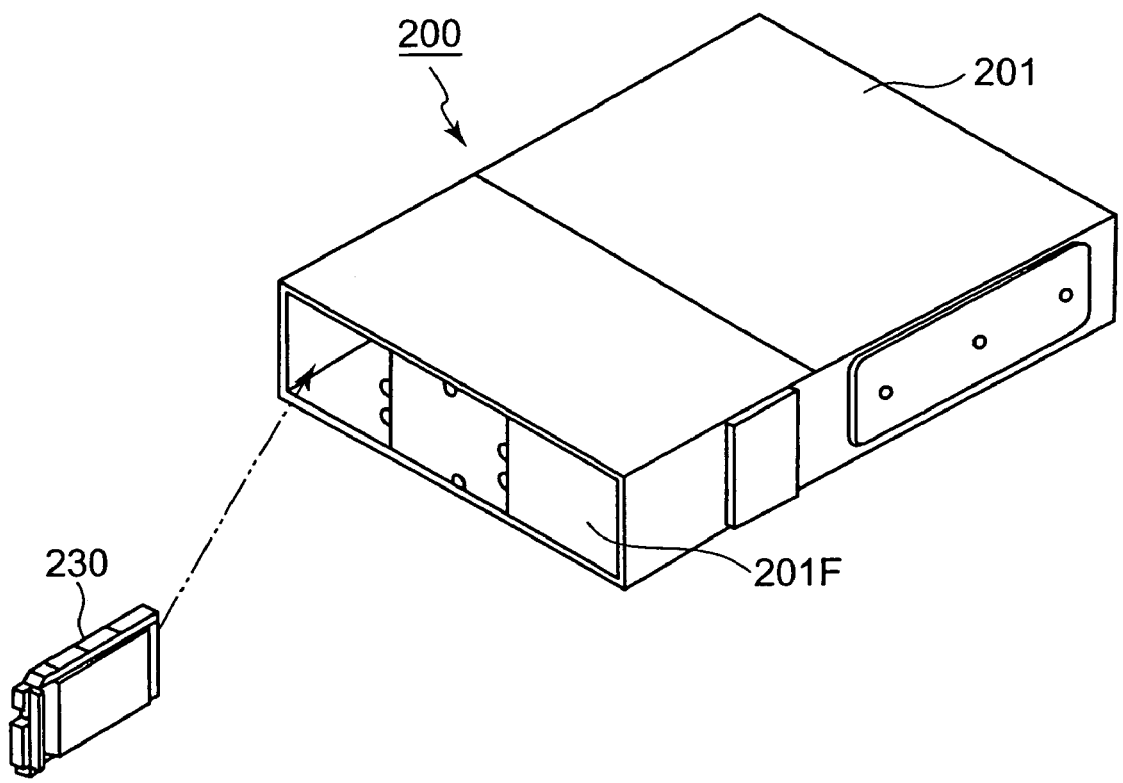
FIG. 5 is a perspective view of an additional enclosure as seen from the front side.

FIG. 5 is a perspective view of the additional enclosure 200 as seen from the front side. The casing 201 of the additional enclosure 200 can have a plurality of disk drives 230 attached to the front side 201F. In this embodiment, a case where a total of fifteen disk drives 230 numbered from #0 to #14 will be described by way of example. The number of mounted disk drives for enclosure is not limited to fifteen. The invasion of dust and so forth from the outside into the casing 201 is prevented by covering the spaces where the disk drives 230 are not attached with facing plates.

Figure 6:
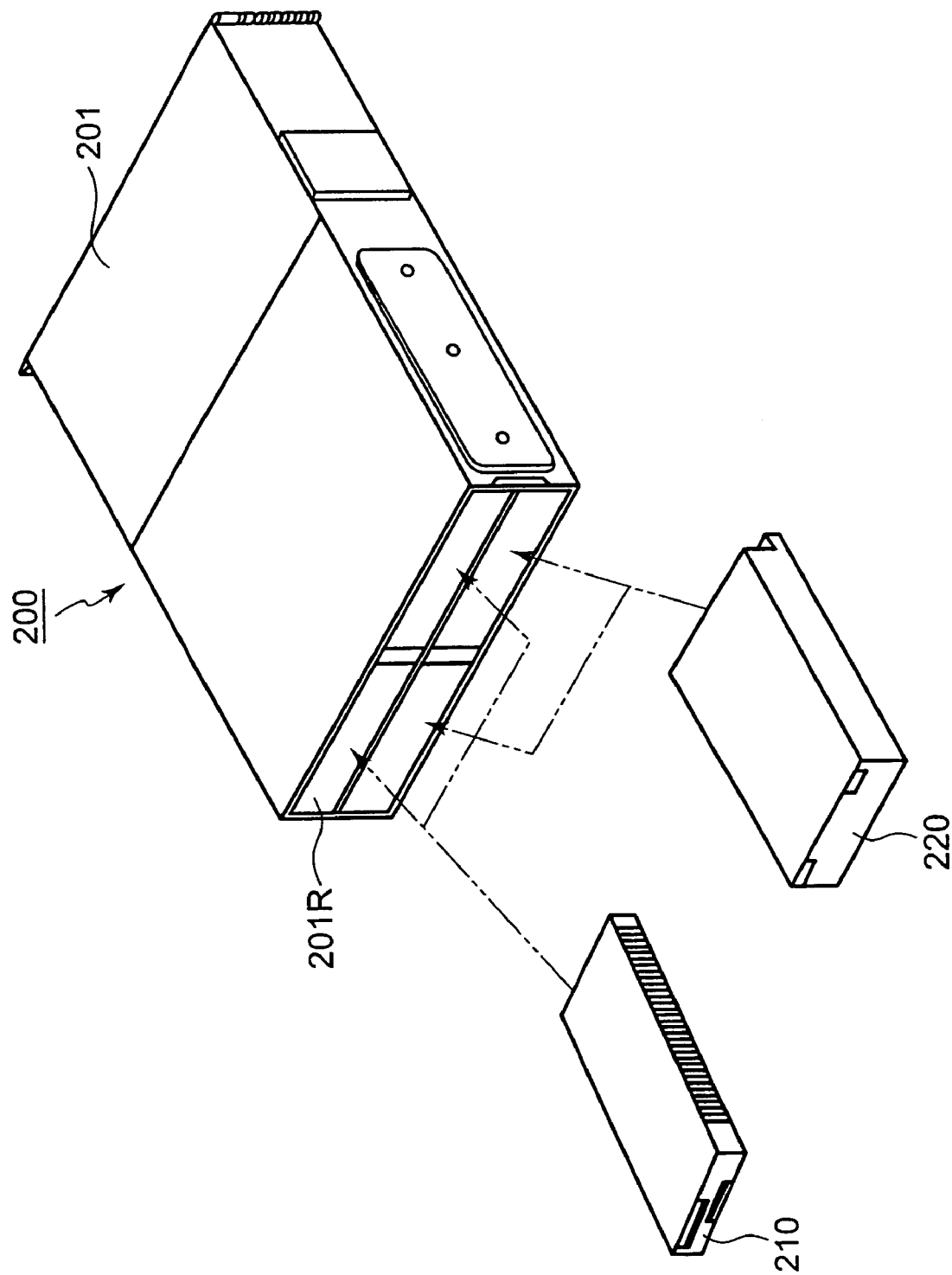
FIG. 6 is a perspective view of the additional enclosure as seen from the rear side.
Figure 8:
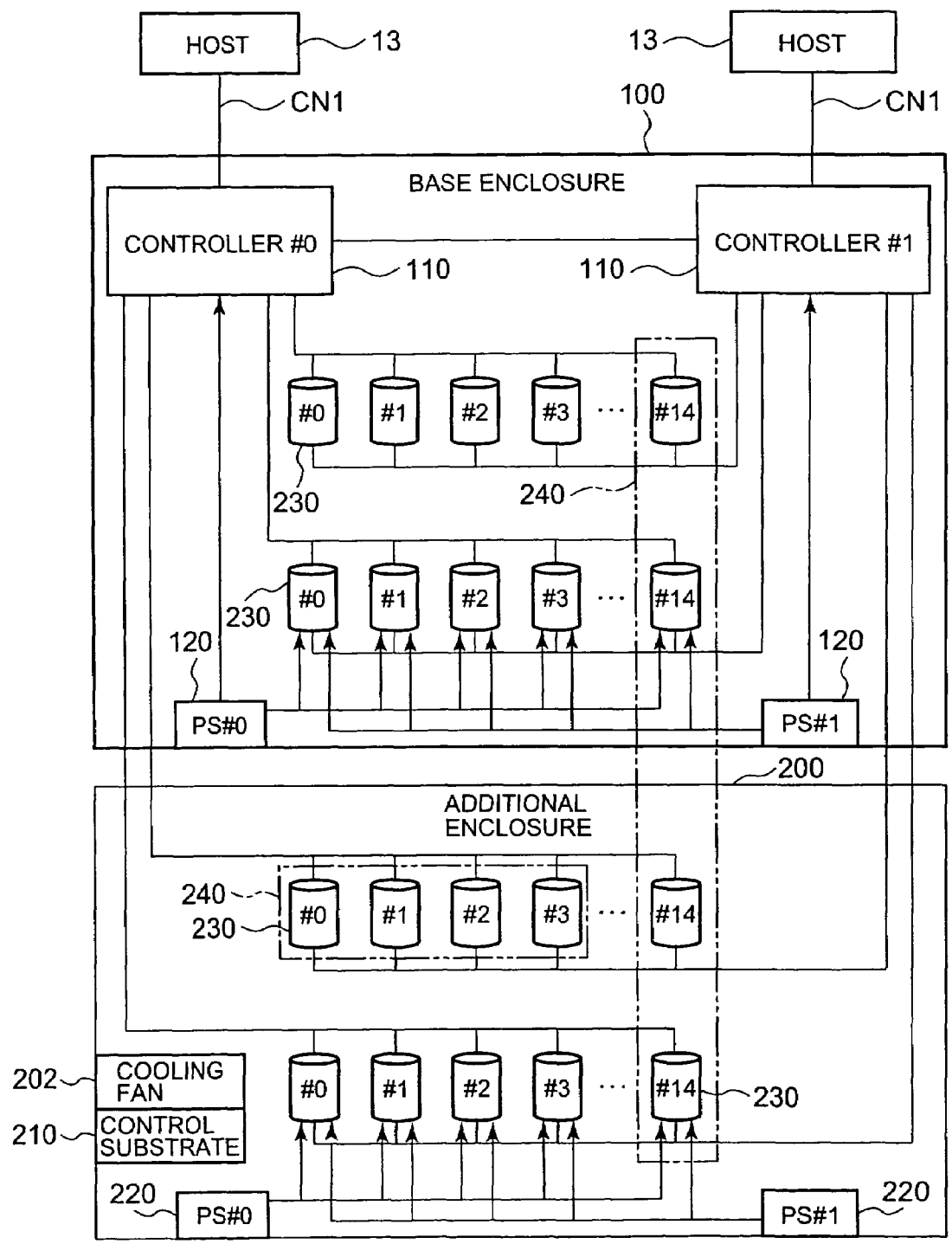
FIG. 8 is an explanatory diagram in which the constitution of the storage control device is shown in a simplified form.

FIG. 6 is a perspective view of the additional enclosure 200 as seen from the rear side. The rear side 201R of the casing 201 has a plurality of control substrates 210 and a plurality of AC/DC supply sections 220 attached thereto. Further, in the constitution of FIG. 6, the cooling fans are mounted in the AC/DC supply sections 220 but, as shown in FIG. 8, a cooling fan 202 can be provided in the additional enclosure 200. In other words, the cooling fan and AC/DC supply sections may be separate constituent parts.

Figure 7:
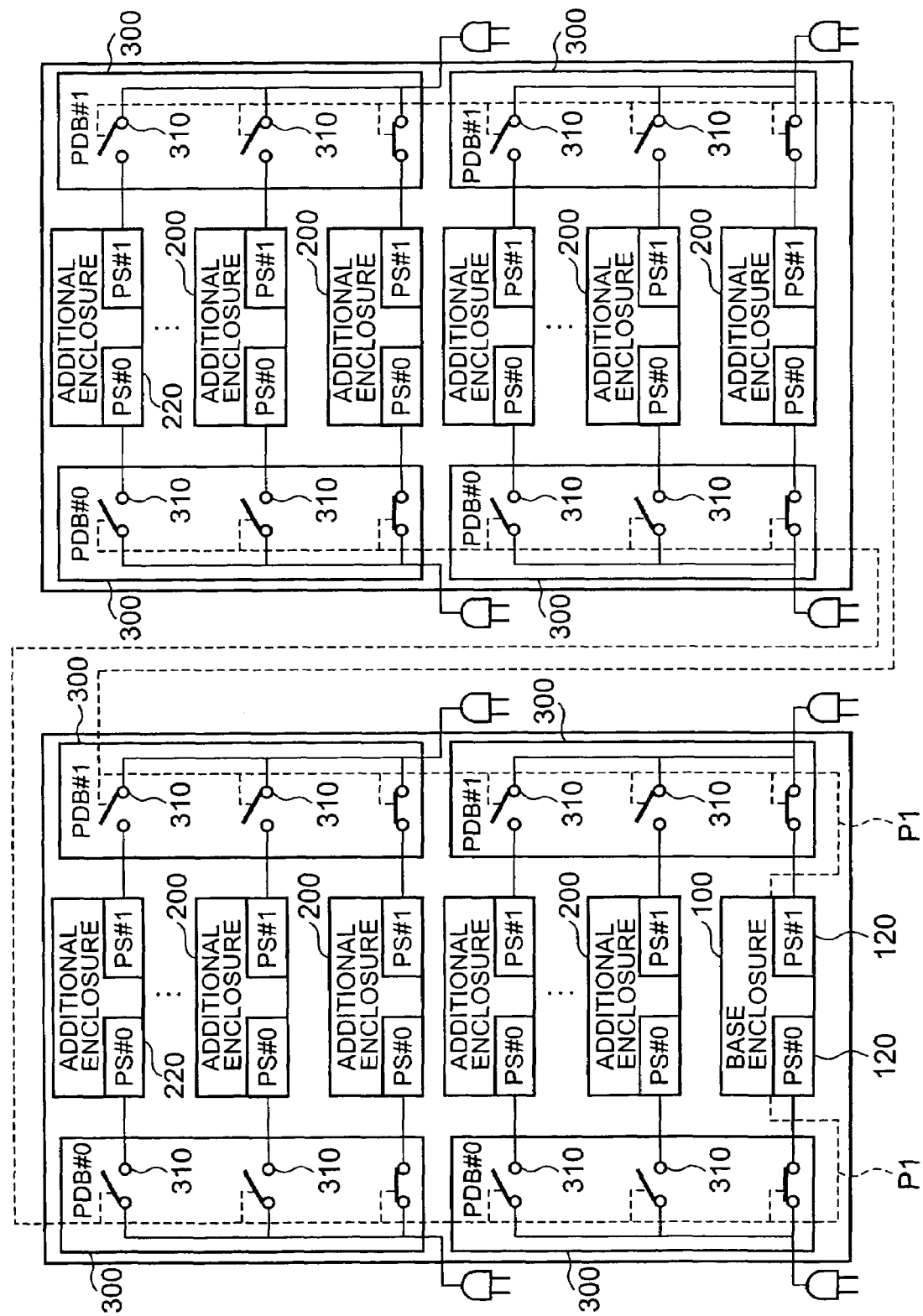
FIG. 7 is an explanatory diagram of the power supply structure of the storage control device.

FIG. 7 is an explanatory diagram that schematically shows the power supply structure of the storage control device. Each of the racks 10 and 11 is provided with a power supply distribution circuit section 300 for distributing power to the enclosures 100 and 200 from the outside. In the following description, the supply distribution circuit section will be called a PDB (Power Distribution Box).

The storage control device comprises a plurality of power supply systems. One system is a system denoted by PDB#0 while the other system is a system denoted by PDB#1. That is, the power supply structure of the storage control device is redundant.

Each PDB300 is able to distribute power from the outside to a predetermined number of enclosures such as four, for example. Therefore, when a multiplicity of enclosures are mounted in one rack, a plurality of PDB300 are required for each of the plurality of power supply systems. Instead, the constitution may be such that a single PDB, which allows power to be distributed from the outside to the maximum number of enclosures that can be mounted in a rack, is used for the respective power supply systems.

Each PDB300 comprises a predetermined number of switches 310. The respective switches 310 are connected to the AC/DC power supply section of the corresponding enclosure. In FIG. 7, the AC/DC power supply section is shown abbreviated as 'PS'.

The respective power supply sections 120 of the base enclosure 100 are each connected to the switches 310 of the PDB300 of the other systems. Likewise, the respective power supply sections 220 of the respective additional enclosures 200 are connected to each of the switches 310 of the other systems PDB300. Hence, even when a fault occurs with either system, power can be supplied from the other system to the base enclosure 100 and each of the additional enclosures 200. As a result, even when power is supplied from only either one system, most of the operations of the system can still be executed.

The controller 110 of the base enclosure 100 is connected to the respective switches 310 of each PDB300 via a signal wire P1 as denoted by the dotted line in FIG. 7 and the opening/closing of each switch 310 can be individually manipulated. The controller 110 blocks the power supply path between the external power supply and the power supply sections 220 by opening each of the switches 310 connected to the additional enclosures 200 when the power supply to the additional enclosure 200 is stopped.

Further, each controller 110 and each PDB 300 may be connected by wire or may be connected wirelessly. When a wireless connection is used, a circuit for opening and closing each switch 310 may be provided in accordance with a wireless signal from the controller 110 in the PDB300.

FIG. 8 is an explanatory diagram that schematically shows the internal constitution of the storage control device. The respective controllers 110 of the base enclosure 100 are each connected to a host 13 via a communication network CN1. Further, each controller 110 is connected to a management terminal 14 via a communication network CN2 as shown in FIG. 9.

The host 13 accesses the storage control device in accordance with the request from the client terminal (not illustrated) and performs data reading/writing, for example. As the host 13, a mainframe computer or server computer or the like can be cited, for example. As the communication network CN1, a LAN (Local Area Network), a SAN (Storage Area Network), an Internet or dedicated line or the like can be cited, for example.

When a LAN is used, the host computer 13 and storage control device communicate in accordance with the TCP/IP (Transmission Control Protocol/Internet Protocol). When a SAN is used, the host computer 13 and storage control device communicate in accordance with the fiber channel protocol. Further, when the host computer 13 is a mainframe computer, a data transfer is performed in accordance with a communication protocol such as FICON (Fibre Connection: registered trade name), ESCON (Enterprise System Connection: registered trade name), ACONARC (Advanced Connection Architecture: registered trade name), and FIBARC (Fibre Connection Architecture: registered trade name), for example.

Figure 9:
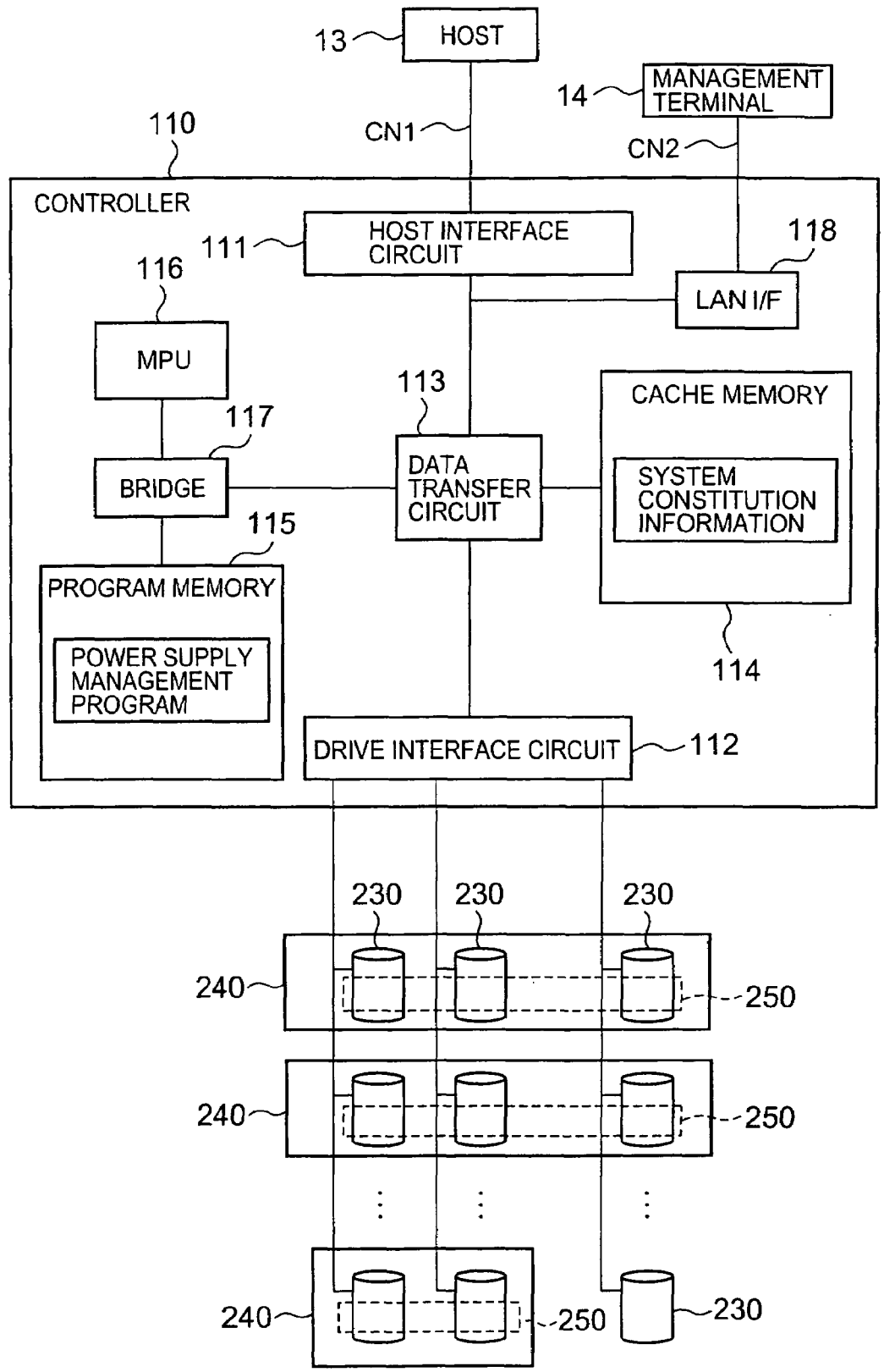
FIG. 9 is an explanatory diagram that shows the constitution of the controller.

In addition, as shown in FIG. 9, the management terminal 14 can also be connected via the management communication network CN2 to the storage control device. The management terminal 14 is a computer terminal for making varied settings for the storage control device. The management terminal 14 is a computer terminal for making various settings for the storage control device. The management terminal 14 can also be connected to a management server (outside FIG. 7). The management server can be constituted as a computer device capable of managing a plurality of storage control devices all together.

The control system of the storage control device is redundant in the same way as the power supply system. #0 controller 110 and #1 controller 110 are capable of accessing all the disk drives 230 under their governance. In other words, even when a fault occurs with one system, data access is possible by the other system. The overall operation of the storage control device is controlled by the controller 110 in the base enclosure 100. Hence, each controller 110 can access not only each disk drive 230 in the base enclosure 100 but also each disk drive 230 in the additional enclosures 200.

Each power supply section 120 of the base enclosure 100 supplies DC power of a predetermined voltage to each disk drive 230 in each controller 110 and base enclosure 100. The power supply section 120 is able to output a plurality of types of voltages such as 5 volts DC and 12 volts DC. Further, although FIG. 7 shows that power is supplied only to the lower disk drive 230 for the sake of expedience in the description, each power supply section 120 supplies power to all the disk drives 230 in the enclosure.

The additional enclosures 200 are shown at the bottom of FIG. 8. Due to space constraints on the page, only one additional enclosure 200 is shown but, as indicated earlier, the base enclosure 100 can be daisy-chain connected to a plurality of additional enclosures 200.

As per the power supply section 120, the power supply section 220 of the additional enclosure 200 converts the power input from the outside into DC power of a predetermined voltage before outputting power of this voltage. DC power is supplied from each power supply section 220 to all the disk drives 230 present in the enclosure, the control substrate 210, and the cooling fan 202. Further, although DC power was described as being supplied by each power supply section 220 for the sake of expedience in the description, the constitution may be such that, normally, for example, DC power is supplied to each disk drive 230 and control substrate 210 by only one power supply section 220 (#0 power supply section, for example). By establishing a difference between the impedances when the respective power supply sections 220 are viewed from the perspective of a load such as the disk drive 230 or control substrate 210, power can be supplied by either power supply section 220. For example, the output from either power supply section 220 may be provided with diodes of a larger number of stages than the other power supply section 220. As a result, when a fault occurs, switching to the other power supply section 220 is performed without throwing a switch, or similar.

The disk drive 230 is constituted as a hard disk drive such as an ATA (AT Attachment) disk, SCSI (Small Computer System Interface) disk, or FC (Fibre Channel) disk, for example. The disk drive 230 is not limited to these disk drives; other storage devices such as semiconductor memory drives (including flash memory devices), optical disk drives, and magneto-optic disk drives, and so forth, for example.

For example, a RAID group 240 is constituted by a predetermined number of disk drives 230 such as one set of four disk drives or one set of eight disk drives. The RAID group 240 can be constituted by a plurality of disk drives 230 that exist in separate enclosures or by one or a plurality of disk drives 230 that exist in the same enclosure.

As shown in FIG. 9, one or a plurality of logical volumes 250 can be provided in the RAID group 240. The logical volume 250 is a target that is accessed by the host 13 which stores data used by the host 13.

FIG. 9 is a block diagram for a case where one controller 110 is considered. The controller 110 is constituted comprising, for example, a host interface circuit 111, a drive interface circuit 112, a data transfer circuit 113, a cache memory 114, a program memory 115, a processor (abbreviated as 'MPU' in FIG. 9) 116, a bridge 117, and a LAN interface 118.

The host interface circuit 111 controls communications with the host 13. Each command and data item issued by the host 13 is received by the host interface circuit 111. Notice of the end of data and command processing read by the disk drive 230 is transmitted by the host interface circuit 111 to the host 13.

The drive interface circuit 112 controls communication with each disk drive 230. The drive interface circuit 112 performs a conversion operation between the logical block address (LBA) and the physical address of the disk drive 230.

The data transfer circuit 113 is a circuit for controlling the transfer of data in the controller 110. The data transfer circuit 113 controls data transfers between the host interface circuit 111 and the cache memory 114 and data transfers between the drive interface circuit 112 and cache memory 114.

The processor 116 comprises one or a plurality of processor cores. The processor 116 implements power supply control and so forth by reading and executing various programs such as power supply management programs stored in the program memory 115.

The cache memory 114 stores data received by the host 13 and data read by the host 13. The cache memory 114 also stores information relating to the system constitution of the storage control device. The storage capacity of the cache memory 114 is backed up by the battery 140.

The bridge 117 connects the processor 116 and the program memory 115. Further, the processor 116 is connected to the data transfer circuit 113 via the bridge 117.

The LAN interface 118 is a circuit for connecting the management terminal 14 and the controller 110. The user is able to supply various instructions to the controller 110 via the management terminal 14, read information relating to the various states of the storage control device and display this information on a screen.

Figure 10:
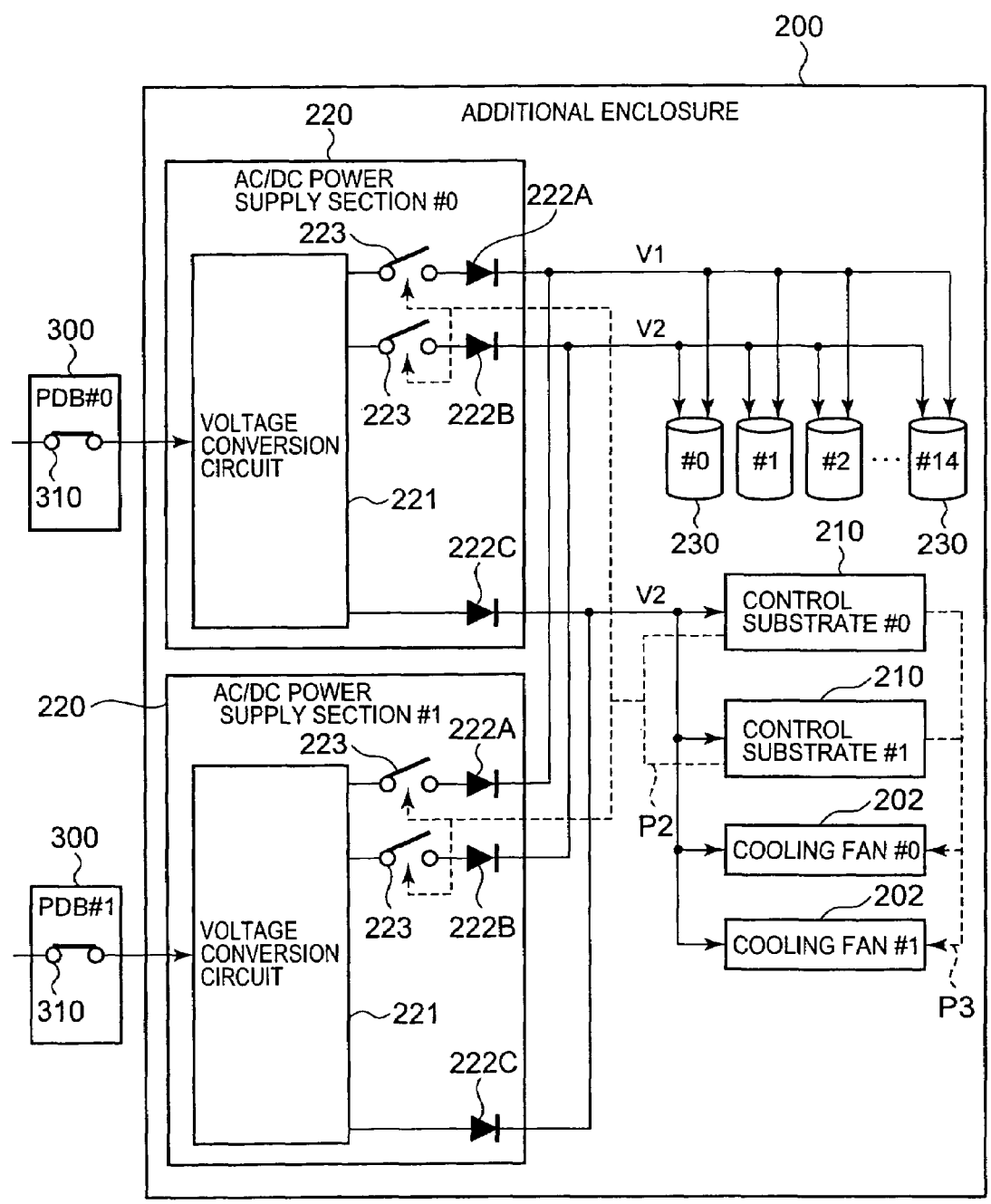
FIG. 10 is an explanatory diagram that shows the constitution of the additional enclosure.

FIG. 10 is a block diagram of the additional enclosure 200. The constitution of the AC/DC power supply section 220 will first be described. The power supply section 220 comprises, for example, a voltage conversion circuit 221, a plurality of output diodes 222A to 222C, and an output control switch 223.

The voltage conversion circuit 221 converts the AC power input via the PDB300 into a plurality of types of DC voltages V1 and V2. For example, V1 is set as being on the order of 5 volts DC and V2 is set as being on the order of 12 volts DC. Each of the output diodes 222A to 222C are provided for the sake of preventing a reverse current. Switch 223 serves to control whether a DC voltage is output and is switched by the control substrate 210.

V1 and V2 are supplied to each disk drive 230. V2 is supplied to each control substrate 210 and each cooling fan 202. As shown in FIG. 10, the outputs of the two power supply sections 220 are OR-connected. Hence, even when a fault occurs in either one power supply section 220, power of a predetermined voltage is supplied to the control substrate 210 and disk drive 230 or the like from the other power supply section 220. When the outputs V1 and V2 from the respective power supply sections 220 are stopped, the supply of power to all the disk drives 230 in the enclosure stops at the same time.

Each control substrate 210 is connected to each switch 223 in each power supply section 220 via a signal wire P2. Each control substrate 210 is able to individually open and close each switch 223. Further, each control substrate 210 is also connected to each cooling fan 202 via a signal wire P3. Each control substrate 210 is able to start or stop the operation of each cooling fan 202 or adjust the speed of rotation of the fan.

Figure 11:
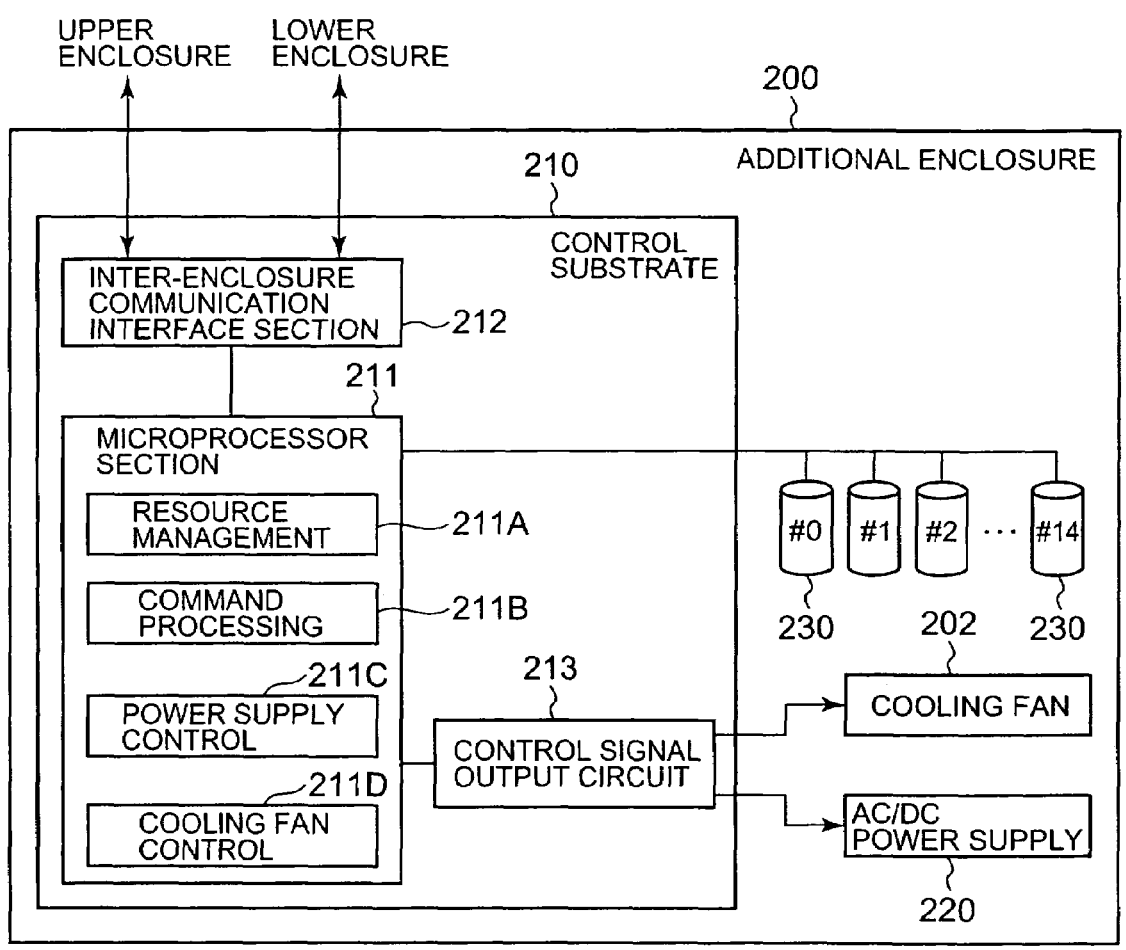
FIG. 11 is an explanatory diagram that shows the constitution of a control substrate.

FIG. 11 is a constitutional explanatory diagram that focuses on one control substrate 210. The control substrate 210 is constituted comprising, for example, a microprocessor section 211, an inter-enclosure communication interface section 212, and a control signal output circuit 213.

The microprocessor section 211 controls the operation of the control substrate 210 and implements, for example, a resource management function 211A, a command processing function 211B, a power supply control function 211C, and a cooling fan control function 211D respectively.

The resource management function 211A is a function for managing the disposition and states and so forth of each of the resources in the additional enclosure 200 (disk drives 230 and power supply section 220 or the like). The command processing function 211B is a function for executing instructions from the controller 110. That is, the command processing function 211B writes data to the designated address of a designated disk drive 230 when the writing of data is requested by the controller 110. Further, the command processing function 211B reads data of a designated length from the designated address of the designated disk drive 230 when the reading of data is requested by the controller 110 and transfers the data thus read to the controller 110 when the reading of data is requested by the controller 110.

The power supply control function 211C is a function for controlling the output of the power supply section 220 by opening and closing the switch 223 on the basis of instructions from the controller 110. The cooling fan control function 211D is a function for controlling the operation of the cooling fan 202 on the basis of instructions from the controller 110.

The inter-enclosure communication interface section 212 performs communications with other adjacent enclosures. The respective additional enclosures 200 are connected using a daisy chain connection to the base enclosure 100 and the commands and data and so forth output from the controller 110 of the base enclosure 100 are transmitted sequentially by the adjacent additional enclosures 200. The higher enclosure shown in FIG. 11 is an enclosure that is located at the top of the connection. That is, it is an enclosure with a shorter connection distance from the base enclosure 100. The lower enclosure is an enclosure that is located at the bottom of the connection and signifies an enclosure that is a greater distance from the base enclosure.

FIG. 12 is an explanatory diagram that shows the constitution of a table T1 for managing the logical volume 250. Table T1 constitutes system constitution information together with a power supply state management table T2 shown in FIG. 13. Each of the tables T1 and T2 are stored in cache memory 114, for example.

Volume management table T1 associates and manages items such as the volume number (LU#) I11, the capacity I12, the RAID group number I13, the RAID level I14, the drive number list I15, and the latest access time I16, for example. Further, the constitution may be such that items other than those shown in FIG. 12 are managed. The constitution may also be such that table T1 is divided into a plurality of tables.

The logical volume number I11 is identification information for uniquely specifying all the logical volumes 250 provided in the storage control device. The capacity I12 is information indicating the storage capacity of the logical volume 250. RAID group number I13 is identification information for uniquely specifying the RAID group 240 in which the logical volume 250 is provided. RAID level I14 is information indicating the RAID level of the RAID group 240. The RAID level can be RAID1, RAID5, or RAID6, for example. The drive number list I15 is information for specifying the disk drive 230 constituting the RAID group 240. The latest access time I16 is information indicating the time at which the host 13 last accessed the logical volume 250. Further, although not illustrated due to the space constraints of the page, the access frequency for each predetermined period and the spare capacity of the respective logical volumes 250, for example, can also be managed by table T1.

FIG. 13 is an explanatory diagram of table T2 for managing the supply state of the power supply of the respective enclosures 100 and 200. The power supply state management table T2 associates and manages, for example, the enclosure number I21, the power supply to enclosure state I22, the drive number I23, the spin state I24, the switch (abbreviated as 'SW' in FIG. 13) number I25 of the first system PDB, the switch state I26, the switch number I27 of the second system PDB, and the switch state I28.

The enclosure number I21 is identification information for uniquely specifying the respective enclosures 100 and 200 constituting the storage control device. The power supply to enclosure state I22 is information indicating whether power is being supplied from the outside to the enclosure. The drive number I23 is identification information for specifying the respective disk drives 230 provided in the enclosure.

The spin state I24 is information indicating whether the disk drive 230 is undergoing spinup or spindown. 'ON' is shown in the case of a spinup state and 'OFF' is shown in the case of a spinoff state.

A spinup state is a state where the disk is rotating at a predetermined speed and data can be read or written. A spindown state is a state where the disk is rotating below the predetermined speed or is stopped. In this state, data cannot be written or read.

The switch number I25 of the first system PDB and the switch number I27 of the second system PDB are information for specifying the respective switches 310 in the PDB of the first power supply system (#0 system) and second power supply system (#1 system) connected to the enclosure. Switch states I26 and I28 are information indicating the open/closed states of the switches 310 specified by I25 and I27. When switch 310 is closed, 'ON' is indicated and, when switch 310 is open, 'OFF' is shown. In this embodiment, in order to improve reliability, switch 310 is constituted as a connection point a that is always open in order to improve reliability.

Figure 14:
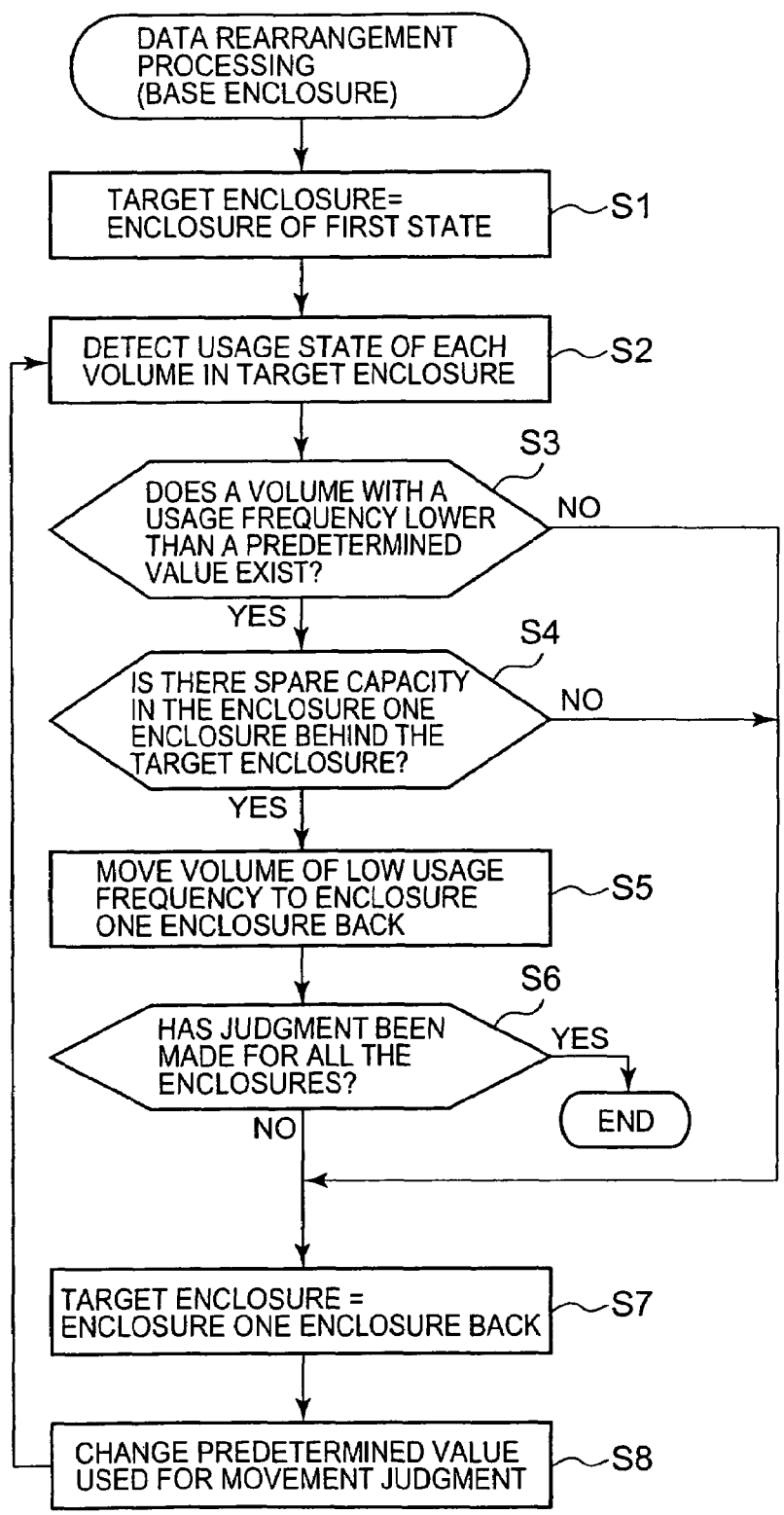
FIG. 14 is a flowchart that shows data rearrangement processing.

FIG. 14 is a flowchart showing data rearrangement processing that is executed by the controller 110. This processing can be executed by choosing a time zone or the like with a small amount of data access by the host 13, for example.

The controller 110 sets the number of the enclosure of the foremost stage as the enclosure number of the data rearrangement target (S1). The enclosure of the foremost stage signifies the enclosure with the highest ranking on the daisy chain connection. Therefore, the number of the base enclosure 100 is set at the start of the processing.

The controller 110 detects the usage states of the respective volumes 250 that exist in the target enclosure set in S1 by using table T1 (S2). Controller 110 judges whether a volume 250 for which the detected usage frequency is lower exists (S3). The predetermined value is set by the user or the like beforehand. The predetermined value is prepared for each level of the storage hierarchy. As mentioned in the schematic diagram of FIG. 1, the storage region of the storage control device can be managed by performing hierarchization to establish a high usage frequency level, a medium usage frequency level, and a low usage frequency level, for example. A predetermined value (threshold value) that is used to judge movement is provided for each of the storage levels corresponding with the usage frequency.

When a volume for which the usage frequency is lower than the predetermined value has been detected (S3:YES), the controller 110 judges whether spare capacity exists in an enclosure that is located one enclosure after the target enclosure (S4). The controller 110 judges whether there is spare capacity of a size that will hold the volume 250 detected in S3 in the enclosure located at the bottom of the connection.

When a space of a predetermined size is present in the lower adjacent enclosure (S4:YES), the controller 110 moves data of the volume 250 detected in S3 to the storage region detected in S4 (S5). For example, the controller 110 newly forms a volume of the predetermined size as the movement destination volume in the storage region of each disk drive 230 of the movement destination enclosure (adjacent lower enclosure). The controller 110 then copies the data in the movement source volume to the movement destination volume by taking a volume 250 with a low usage frequency in the target enclosure as the movement source volume. After copying is complete, the data of the movement source volume is erased.

The controller 110 repeats S2 to S5 until the requirement for data re-arrangement is judged for all the enclosures in the storage control device (S6:NO). In other words, the controller 110 shifts the enclosure number of the target enclosure one back (S7) and, if necessary, changes the predetermined value used for the movement judgment (S8).

For example, directly after data rearrangement has been judged for the base enclosure 100, the additional enclosure 200 (#1) that is adjacent to the base enclosure 100 is set in S7. When the additional enclosure 200 set in S7 and the target enclosure that was judged immediately beforehand are located in separate storage levels, the threshold value used to judge movement is also changed. S2 to S6 are subsequently repeated sequentially starting with base enclosure 100 and working through each of the lower additional enclosures 200 as mentioned earlier. This processing ends when data rearrangement has been judged for all the enclosures (S6:YES).

By performing the processing shown in FIG. 14, volumes with a low usage frequency are assembled in additional enclosures 200 that are a long connection distance from the base enclosure 100. Further, although not illustrated in FIG. 14, data rearrangement in the reverse direction can also be performed. That is, for example, volumes 250 with a higher usage frequency than a preset predetermined value, for example, can also be moved to additional enclosures 200 close to the base enclosure 100. Further, the data rearrangement can be executed as a result of the user providing an instruction via the management terminal 14.

Figure 15:
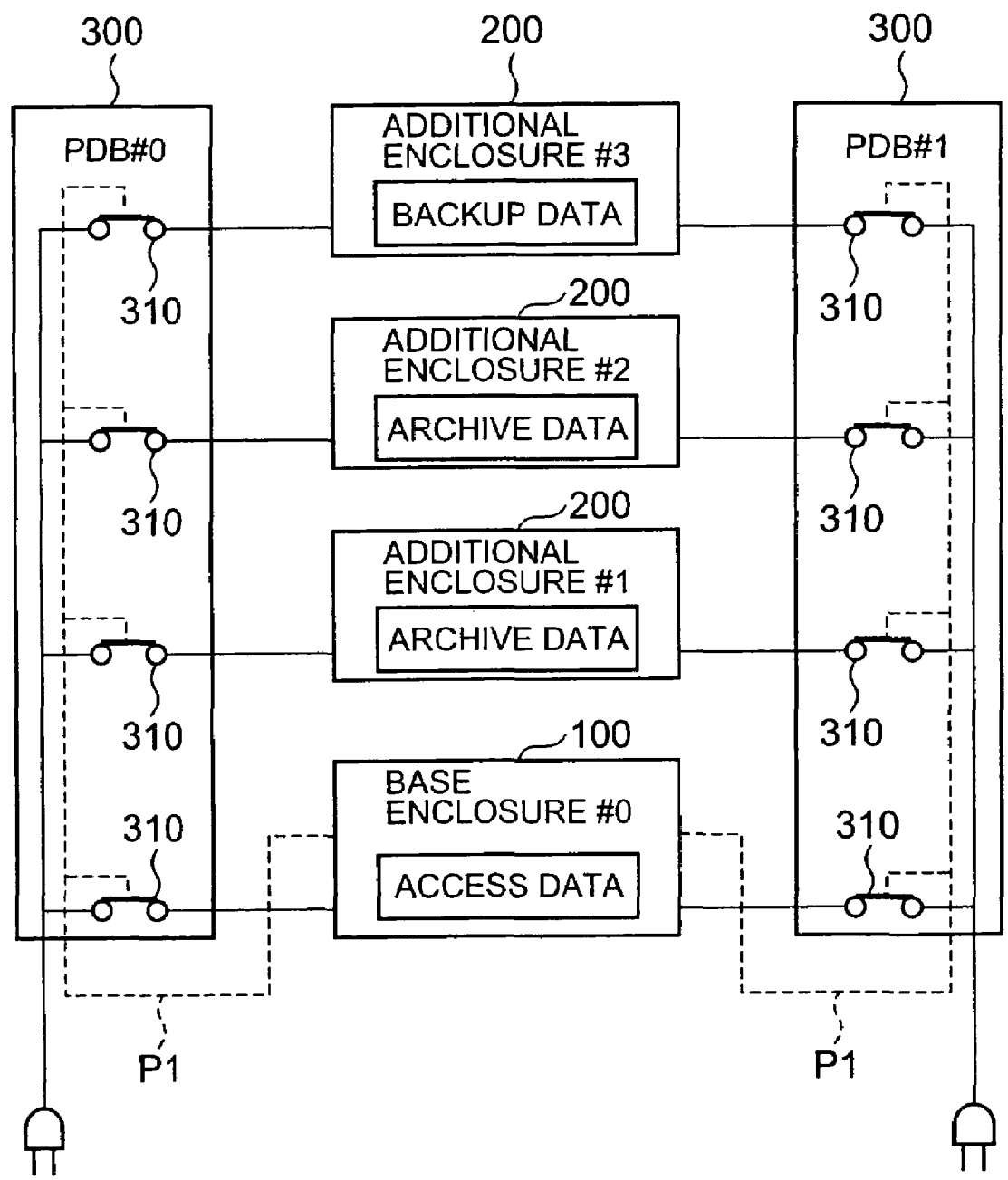
FIG. 15 is an explanatory diagram that shows an aspect in which data are arranged in accordance with the usage frequency.

FIG. 15 is an explanatory diagram that schematically shows an aspect of a case where data rearrangement is performed. As shown in FIG. 15, backup data with a small usage frequency is stored in the additional enclosure 200 (#3) the shortest distance from the base enclosure 100. Data with the highest usage frequency is saved in the base enclosure 100. In FIG. 15, data that is used highly frequently by the host 13 are expressed as access data. Further, archive data are stored in another additional enclosure 200 (#2) that is adjacent to the base enclosure 100.

Thus, in this embodiment, the physical disposition of the storage control device and the logical storage levels match. The physical disposition is the disposition on the connection. As shown in FIG. 2, the respective enclosures are held in racks in a stacked state and, therefore, the physical positional relationship corresponds with the connection distance.

The additional enclosures 200 that are a shorter connection distance from the base enclosure 100 are stored in racks closer to the base enclosure 100. On the other hand, the storage levels which hierarchize the storage regions of the storage control device in accordance with the usage frequency have a logical existence and are essentially independent of the positional relationship of the enclosures. Therefore, conventionally, the storage levels are established unrelated to the physical positions of the enclosures 100 and 200; hence, the user cannot know the constitution of the storage levels from only the physical positional relationships of the enclosures. In contrast, in this embodiment, the respective additional enclosures 200 are daisy-chain connected to the base enclosure 100 and data with a high usage frequency are stored in order starting with the enclosures close to the base enclosure 100 (including the enclosures of the base enclosure 100 when the base enclosure 100 comprises disk drives 230 as per this embodiment), and the data with a lower usage frequency are stored in additional enclosures 200 at a greater connection distance (from the base enclosure 100). Therefore, in this embodiment, the constitution of the storage levels can be visualized by the physical disposition of the enclosures. The users are able to know the location of the storage levels from the physical disposition that is easy to determine from the exterior appearance of the storage control device, whereby user convenience improves. Furthermore, by collecting data with a low usage frequency in enclosures with a long connection distance in this manner, stoppage of the power supply of individual enclosure units can be effectively performed as will be described subsequently.

Furthermore, for example, the host 13 places data whose usage frequency is evident in a suitable physical position (storage level) of the disk device beforehand, whereby electricity conservation can be further improved.

Figure 16:
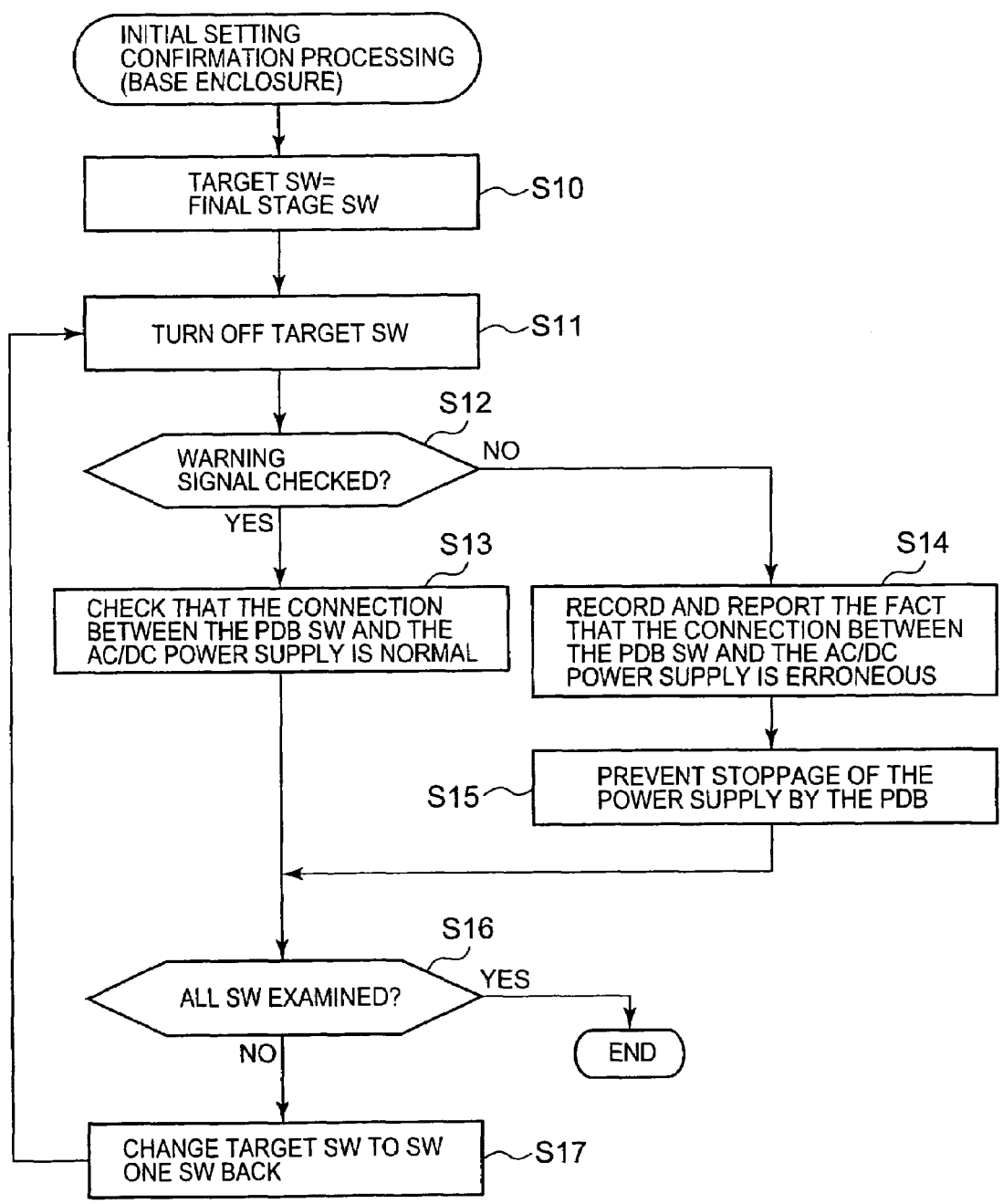
FIG. 16 is a flowchart that shows processing for checking the power supply connection.

FIG. 16 is a flowchart that shows the processing for checking the initial settings of the connection constitution pertaining to the power supply. Which switch 310 of which PDB300 is connected to which enclosure can be determined by the user. The user is able to register the constitution relating to its own connection in Table T2 of the controller 110 via management terminal 14. However, the complete elimination of human error is difficult. Hence, by executing the processing shown in FIG. 16, it is examined whether the power-supply connection constitution registered by the user is correct.

This processing is executed separately for the first power supply system and the second power supply system. The controller 110 sets the number of the final-stage switch 310 as the number of the judgment target switch 310 (S10). This number is the number of the switch 310 of the first power supply system connected to the enclosure 200 located at the end of the connection.

The controller 110 outputs a control signal to the switch 310 set in S10 and turns off this switch 310 (S11). The controller 110 checks whether a warning signal indicating an electricity outage has been output by the power supply section 220 that should be connected to the switch 310 set in S10 (S12) The respective power supplies 120 and 220 are constituted to output a warning signal to the outside when the power supply from the outside is interrupted.

When a warning signal is output from the power supply section 220 that should be connected to the switch 310 set in S10 (S12:YES), the controller 110 judges the information registered by the user to be correct (S13). When the warning signal has not been output by the power supply section 220 that is to be connected to the switch 310 set in S10 (S12:NO), the controller 110 judges that the information registered by the user is erroneous (S14). When an error is detected in the information registered by the user, the power supply is not halted by the PDB300 (S15).

The controller 110 judges whether a judgment of the connection state has been performed for all the switches 310 (S16). When an unjudged switch 310 exists (S15:YES), the controller 110 changes the target switch number to the number of the previous switch 310 (S17) and repeats S11 to S15. When scanning is complete for all the switches 310 (S15: YES), the controller 110 ends the processing. Further, as also shown in S15, when an error is detected with the connection state, at least switch manipulation relating to an erroneous connection location is not performed. When an error is detected with the connection pertaining to the power supply, stoppage of the power supply by the PDB300 can be prevented until the error is corrected.

Figure 17:
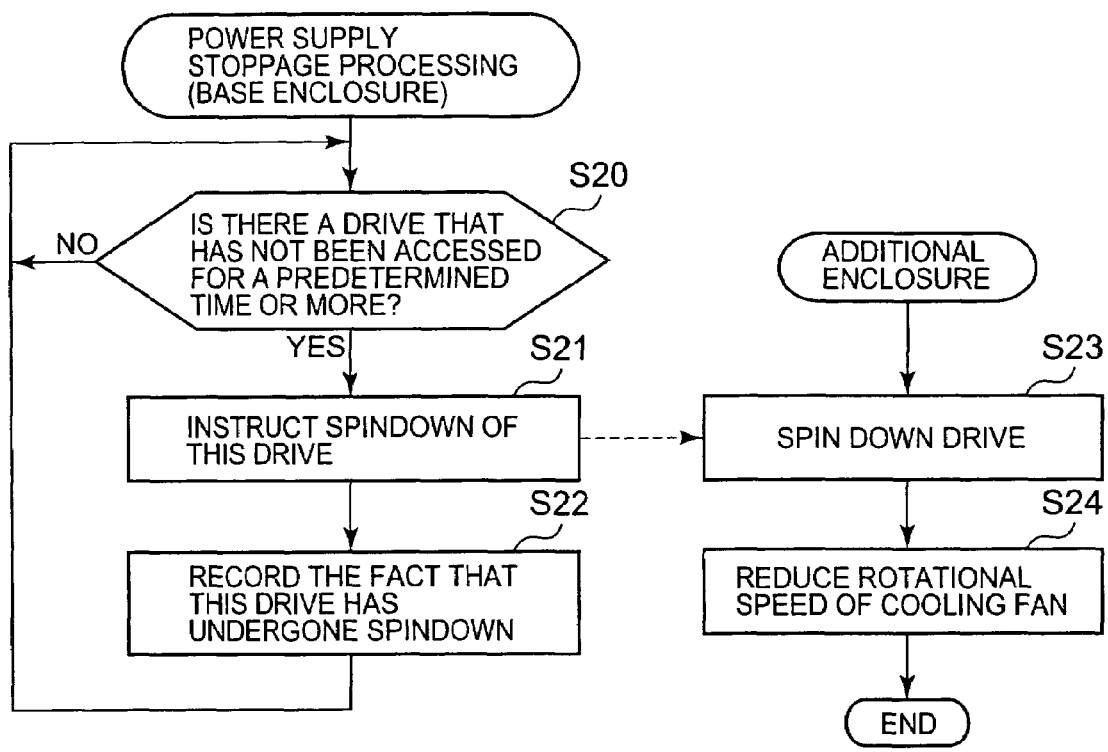
FIG. 17 is a flowchart that shows processing for performing power conservation for each drive.

FIG. 17 is a flowchart showing the power supply stoppage processing of one mode. In this processing, power savings are made for each disk drive 230. This processing is an example of mode F1 that appears in FIG. 1.

The controller 110 judges, by referencing Table T1, whether a disk drive 230 that has not been accessed for a predetermined time exists (S20). The user is able to set an optional value such as one hour or the like, for example.

Upon detecting a disk drive 230 that has not been accessed for the predetermined time (S20:YES), the controller 110 issues an instruction to change the disk drive 230 to a spindown state to the additional enclosure 200 that exists in the disk drive 230 (S21). The controller 110 records the spin state of the disk drive 230 detected in S20 in Table T2 as a spinoff. The instructions (commands) issued by the controller 110 are transmitted to the target additional enclosure 200 while sequentially working through the adjacent additional enclosures 200.

The control substrate 210 of the additional enclosure 200 that received an instruction from the controller 110 spins down the designated disk drive 230 (S23). Further, the control substrate 210 lowers the rotational speed of the cooling fan 202 if possible (S24).

For example, when another disk drive 230 is operating in the enclosure, the rotational speed of the cooling fan 202 is held at a fixed value in order to maintain the cooling performance. The control substrate 210 is also able to reduce the rotational speed of the cooling fan 202. In contrast, in S23, when the cooling performance can be reduced by spinning down one or a plurality of disk drives 230, the control substrate 210 can also reduce the rotational speed of the cooling fan 202. Further, the decision of whether to reduce the rotational speed of the cooling fan 202 may also be determined by the controller 110 or by the control substrate 210 of the additional enclosure 200.

Figure 18:
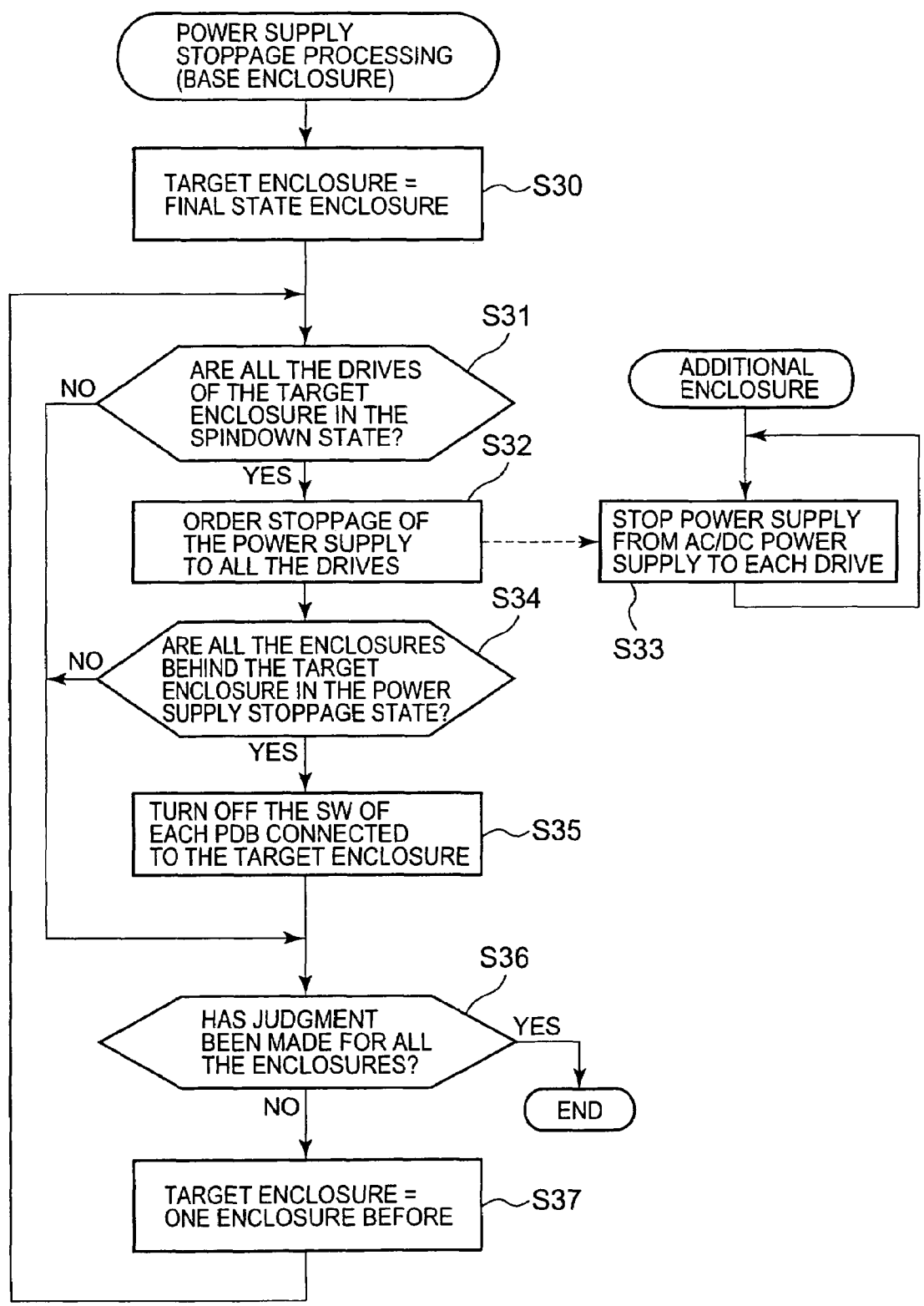
FIG. 18 is a flowchart that shows processing for stopping the supply of power to each additional enclosure.

FIG. 18 is a flowchart showing the power supply stoppage processing by means of another mode. In this processing, stoppage of communications with respect to all the disk drives 230 in the enclosure (mode F2 in FIG. 1), stoppage of communication excluding the control function (mode F3 in FIG. 1), and stoppage of the power supply to all the enclosures (mode F4 in FIG. 1) are shown.

The controller 110 sets the number of the additional enclosure 200 that is located at the very rear of the connection as the number of the target enclosure that judges whether the power supply is to be halted (S30). The controller 110 uses Table T2 to judge whether all the disk drives 230 in the target enclosure are in a spindown state (S31). As shown in FIG. 17, when there is no access for a predetermined time or more to the respective disk drives 230, each disk drive 230 is individually placed in the spindown state. When data access with respect to disk drives 230 placed in the spindown state has occurred, the disk drives 230 are changed to the spinup state.

When it is judged that all the disk drives 230 in the target enclosure are in the spindown state (S31:YES), the controller 110 issues an instruction to stop communications with respect to all the disk drives 230 to the control substrate 210 of the target enclosure (S32). The control substrate 210 of the target enclosure stops the outputs V1 and V2 by opening the switch 223 in the power supply section 220 and stops the supply of power to all the disk drives 230 in the enclosure (S33). Further, in this case, the controller 110 can also request not only stoppage of communications with respect to all the disk drives 230 but also stoppage of all the functions other than the signal transmission function. For example, the controller 110 is able to request stoppage of the cooling fan 202.

When any one (or more) disk drives 230 among the respective disk drives 230 in the target enclosure is in the spinup state (S31:NO), S34 and S35 are skipped and the processing moves to S36.

The controller 110 judges whether the respective lower enclosures located behind the target enclosure are all in the power supply stoppage state after instructing that communications with respect to all the disk drives 230 in the target enclosure be stopped (S34). When power from the PDB300 of each system is not being supplied to each enclosure below the target enclosure (S34:YES), the controller 110 turns off the respective switches 310 of the PDB300 of each system connected to the target enclosure and stops the supply of power from the outside (S35). As a result, the target enclosure stops functioning. Thereupon, the controller 110 first turns off the switch 310 of the PDB300 of the first system (PDB#0) and checks that a warning signal reporting a stop in the supply of power has been output by the power supply section 220 in the first system. Once the supply of power in the first system has stopped correctly, the controller 110 turns off the switch 310 of the PDB300 of the second system (PDB#1)

The controller 110 judges whether all the enclosures in the storage control device have been judged (S36) and, when an unjudged enclosure exists (S36:NO), changes the number of the target enclosure to the number of the previous enclosure adjacent to the target enclosure (S37). That is, the number of the upper enclosure adjacent to the target enclosure is set. S31 to S36 are then repeated.

Thus, in this embodiment, it is judged whether to stop communications with respect to the enclosures sequentially starting with the additional enclosure 200 the greatest distance from the base enclosure 100. As mentioned in the data rearrangement processing, in this embodiment, data with a low usage frequency is disposed in the additional enclosure 200 the greatest connection distance from the base enclosure 100. Hence, because the probability of data access drops for the lower additional enclosure 200 with greater connection distances, the opportunity to be able to stop the supply of power to such enclosures increases. Hence, the amount of power consumption of the storage control device overall can be reduced below that of the prior art.

Figure 19:
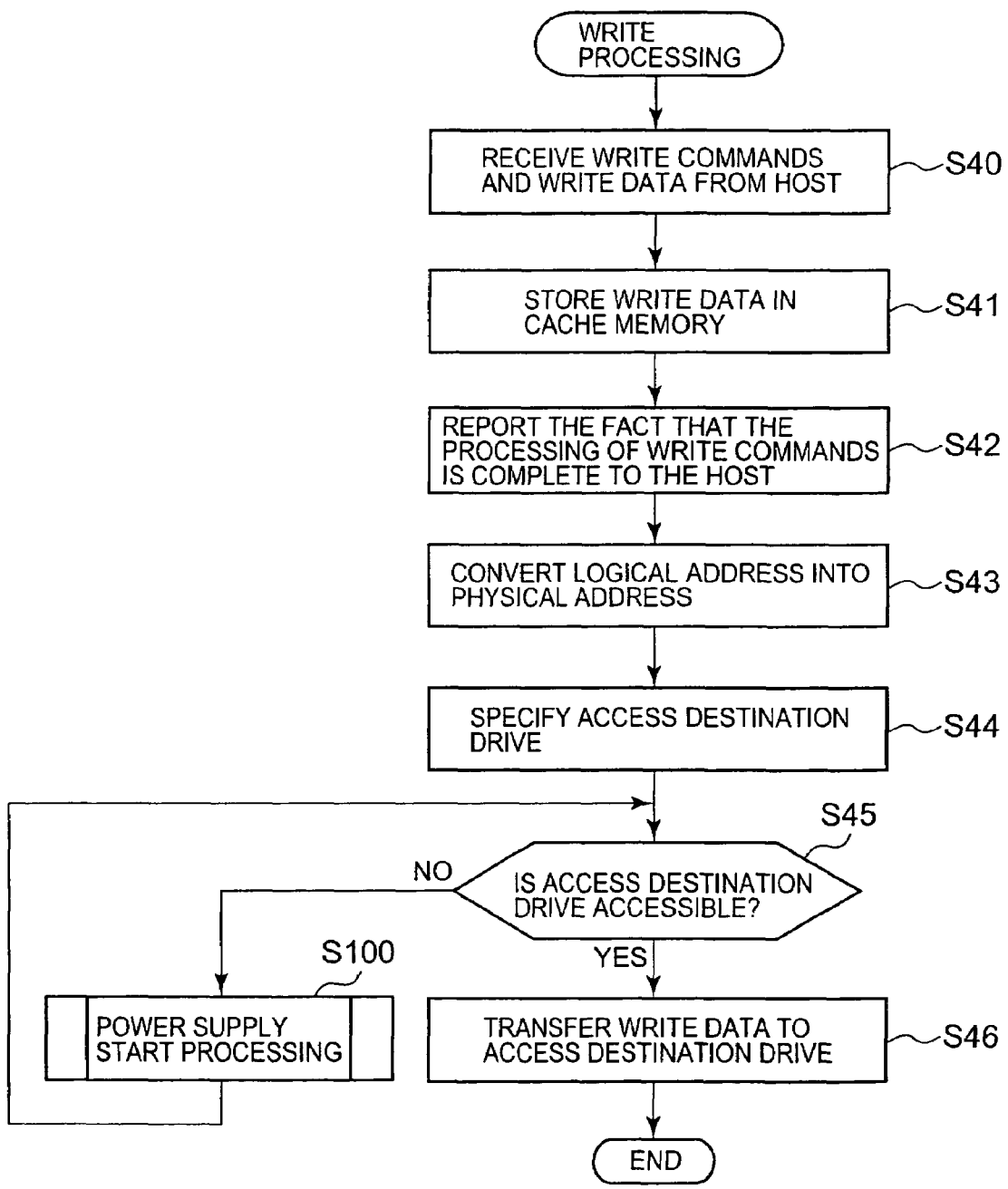
FIG. 19 is a flowchart that shows write processing.

FIG. 19 shows a flowchart for processing a write command that is issued by the host 13.

Upon receipt of the write command and write data from the host 13 (S40), the controller 110 stores the write data in the cache memory 114 (S41). The controller 110 reports the fact that the write command processing to the host 13 has ended at the moment when write data are stored in the cache memory 114 (S42). The controller 110 converts the logical address specified in the write command to a physical address of the disk drive 230 (S43) and specifies the access target disk drive 230 (S44). In the following description, the access target disk drive 230 is sometimes presented as the 'access destination drive' for the sake of convenience.

The controller 110 judges whether the access destination drive specified in S44 can be accessed by using Table T2 (S45). When the access destination drive is in the spinup state and the communication path to the additional enclosure 200 comprising the access destination drive is normal, the access destination drive can be immediately accessed. When the access destination drive is judged to be accessible (S45:YES), the controller 110 transfers write data to the access destination drive (S46). The write data are transmitted from the base enclosure 100 to the additional enclosure 200 of the access destination drive sequentially via the adjacent additional enclosure 200. The control substrate 210 writes the write data to the designated disk drive 230 (which is the access destination drive) upon receipt of the write data.

In contrast, when access to the access destination drive is judged as being nonfunctional (S45:NO), power supply start processing, which will be described subsequently, is executed (S100). Thus, in this embodiment, before write data are transferred to the access destination drive, it is judged whether the access destination drive can be accessed and, when access is denied, power supply start processing is executed. In contrast, as per an embodiment that will be described subsequently, power supply start processing can also be executed when the writing of write data to the access destination drive has not been possible.

Figure 20:
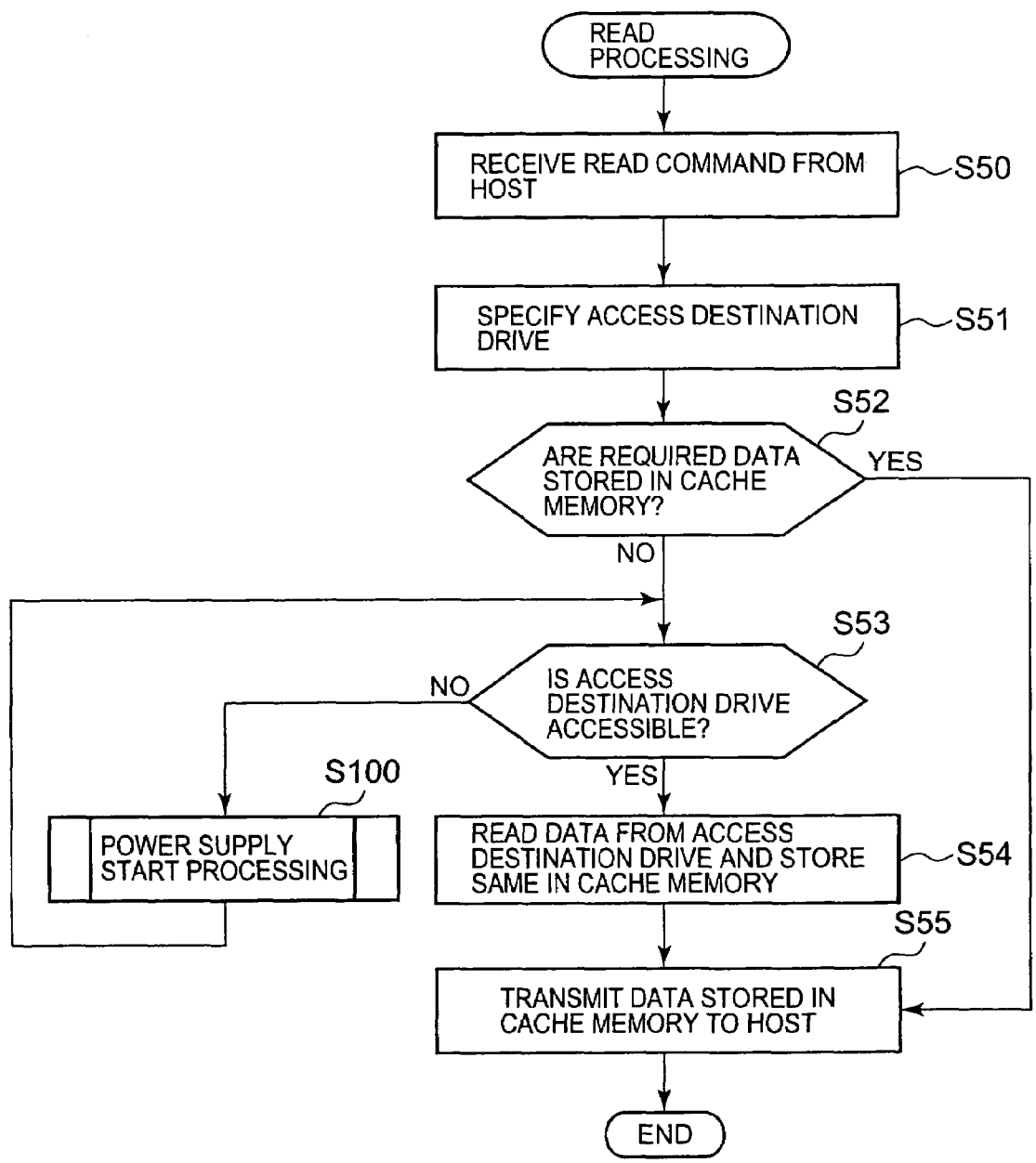
FIG. 20 is a flowchart that shows read processing.

FIG. 20 shows a flowchart for processing read commands issued by the host 13. Upon receipt of a read command from the host 13 (S50), the controller 110 specifies the access destination drive (S51). The access destination drive used here is the disk drive 230 that stores data for which reading has been requested.

The controller 110 judges whether the data requested by the host 13 has been stored in the cache memory 114 (S52). In the following description, data for which reading has been requested by the host 13 is sometimes called read data.

When read data have been stored in the cache memory 114 (S52:YES), the subsequently described steps S53 and S54 are skipped and the read data stored in the cache memory 114 are transmitted to the host 13 (S55).

When the read data have not been stored in the cache memory 114 (S52:NO), the controller 110 judges whether it is possible to access the access destination drive using Table T2 (S53). When it is judged that the access destination drive can be accessed (S53:YES), the controller 110 reads the read data from the access destination drive and stores the data in the cache memory 114 (S54). The controller 110 then transmits the read data stored in the cache memory 114 to the host 13 (S55).

In contrast, when it is judged that access is denied to the access destination drive (S53:NO), the controller 110 executes power supply start processing (S100).

Figure 21:
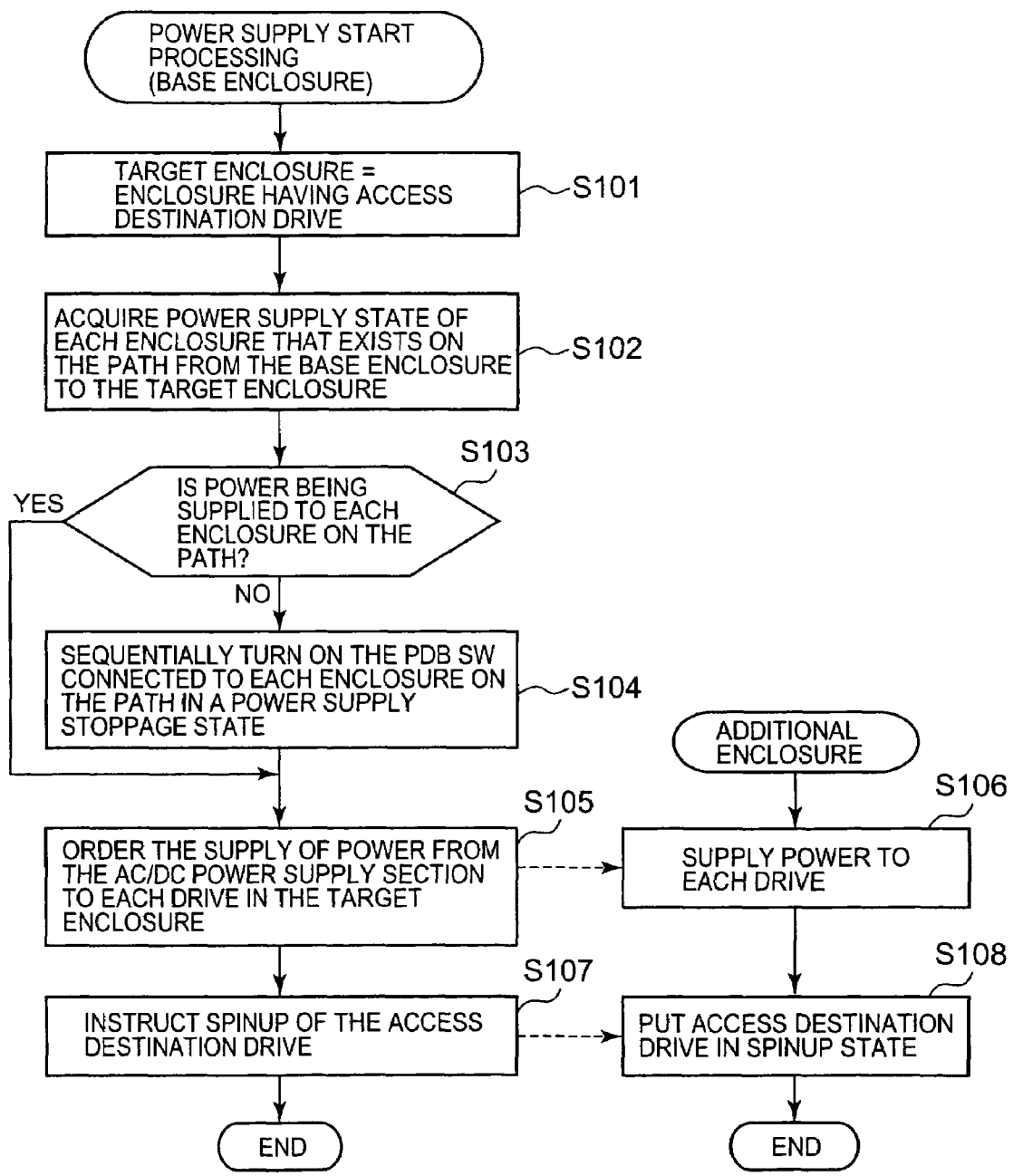
FIG. 21 is a flowchart that shows processing in a case where the power supply is started.

FIG. 21 is a flowchart that shows the details of the power supply start processing (S100). The controller 110 sets the number of the additional enclosure 200 of the access destination drive as the number of the target enclosure (S101).

The controller 110 uses Table T2 to acquire the respective power supply states of the respective additional enclosures 200 on the transmission path from the base enclosure 100 to the target enclosure set in S101 (S102).

The controller 110 judges whether external power is being supplied by the PDB300 to the respective additional enclosures 200 on the transmission path (S103). When it is judged that an external power supply is not being supplied to the additional enclosures 200 located on the path (S103:NO), the controller 110 sequentially turns on the switch 310 in the PDB300 connected to each additional enclosure 200 for which the power supply has been stopped (S104). In other words, the controller 110 supplies external power sequentially starting from the top to the respective additional enclosures 200 located on the transmission path in order to activate the additional enclosures 200. However, in S104, external power is only supplied to the respective additional enclosures 200 midway along the path and the disk drives 230 in the respective additional enclosures 200 midway along the path are not made to undergo spinup. This is because it is sufficient to only revive the transmission functions of the commands and data and so forth by activating the respective control substrates 210 on the path.

When external power is being supplied by the PDB300 to the respective additional enclosures 200 on the path (S103:YES), S104 is skipped. The controller 110 issues an instruction to the target enclosure to supply DC power V1 and V2 from the power supply section 220 to all the disk drives 230 in the target enclosure (S105). The control substrate 210 of the target enclosure supplies power to the respective disk drives 230 by turning ON the switch 223 in the power supply section 220 upon receipt of the instruction issued in S105 (S106).

The controller 110 instructs the control substrate 210 of the target enclosure to spin up the access destination drive (S107). The control substrate 210 that received the instruction spins up only the access destination drive (S108)

Figure 22:
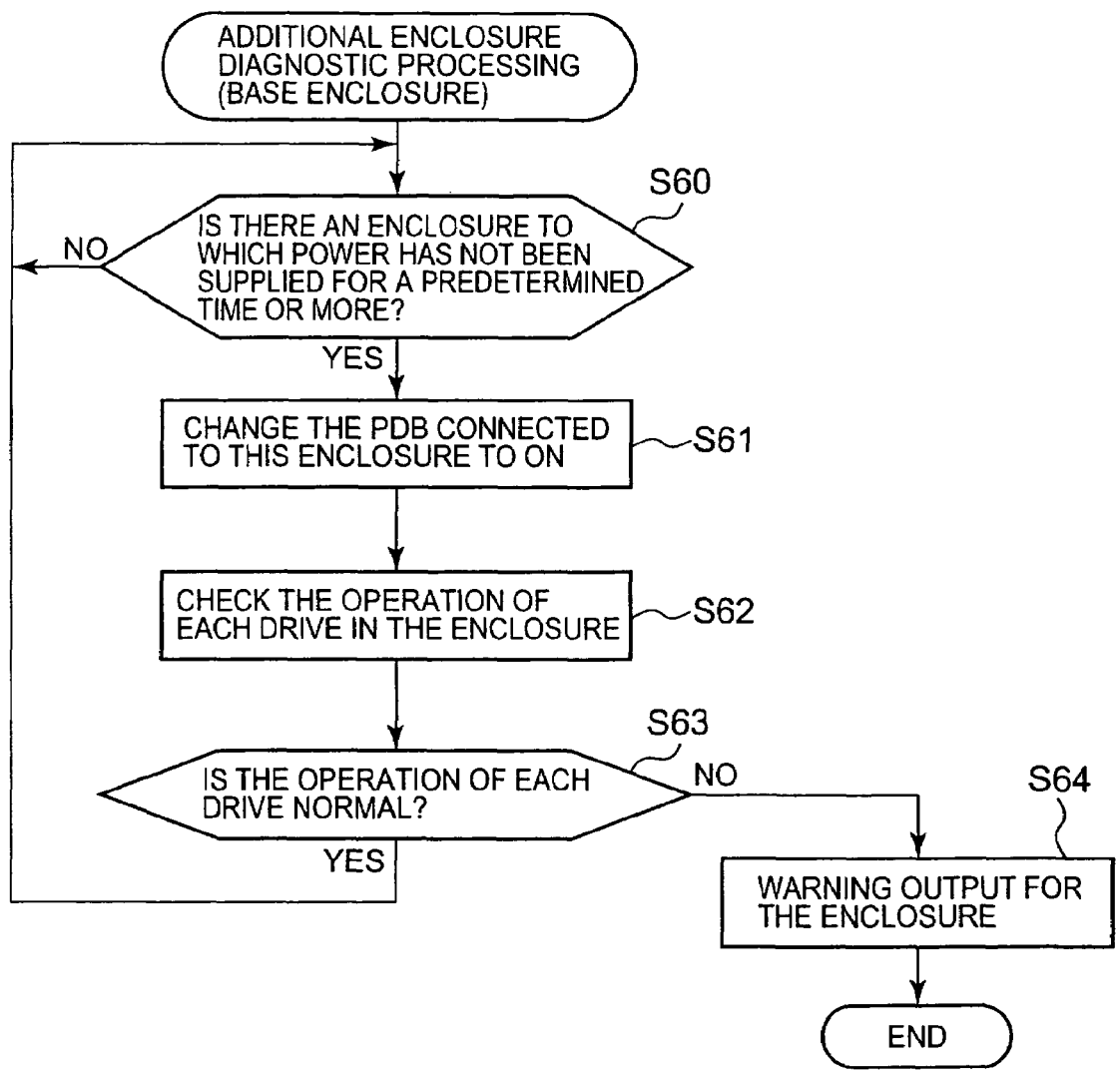
FIG. 22 is a flowchart that shows processing for diagnosing the additional enclosures during a power halt.

FIG. 22 is a flowchart that shows self-diagnostic processing. When the power to the additional enclosures 200 storing data of a low access frequency is stopped for a long time, it is not possible to also detect the occurrence of a fault in the additional enclosures 200 to which the supply of power has been halted and it is probable that it will not be possible to obtain data when the data are required. Therefore, in this embodiment, by supplying power to additional enclosures 200 in hibernation at regular or irregular intervals, it is checked whether the additional enclosures 200 are working properly. This self-diagnostic processing can be executed at regular intervals at predetermined times that are preset or can be executed at irregular intervals at times designated optionally by the user.

The controller 110 uses Table T2 to judge whether an additional enclosure 200 to which external power has not been supplied from the PDB300 for a predetermined time or more is present (S60). When an additional enclosure 200 that has not been ON for a predetermined time or more is found (S60:YES), the controller 110 supplies external power to the additional enclosure 200 by turning ON the switch 310 in the PDB300 connected to the additional enclosure 200 (S61).

The controller 110 transmits commands that have been preset as diagnostic commands (spinup commands and spindown commands and so forth) to the additional enclosure 200 and checks the operation of each disk drive 230 in the additional enclosure 200 (S62). The controller 110 judges whether all the disk drives 230 in the additional enclosure 200 are operating normally (S63). When the controller 110 judges that all the disk drives 230 are operating normally (S63:YES), the processing returns to S60. When any one or more disk drives 230 are not operating normally (S63:NO), the controller 110 outputs a warning to the effect that an anomaly has occurred with the additional enclosure 200 (S64). This warning is reported to the user via-the management terminal 14. Further, when the management terminal 14 is connected to a management server, the warning is transmitted from the management terminal 14 to the management server.

Further, in order to transmit a diagnostic command to the additional enclosure 200 of the diagnostic target, the control substrate 210 of each additional enclosure 200 on the connection is activated so that the transmission path between the base enclosure 100 and the additional enclosure 200 of the diagnostic target is then effective.

Figure 23:
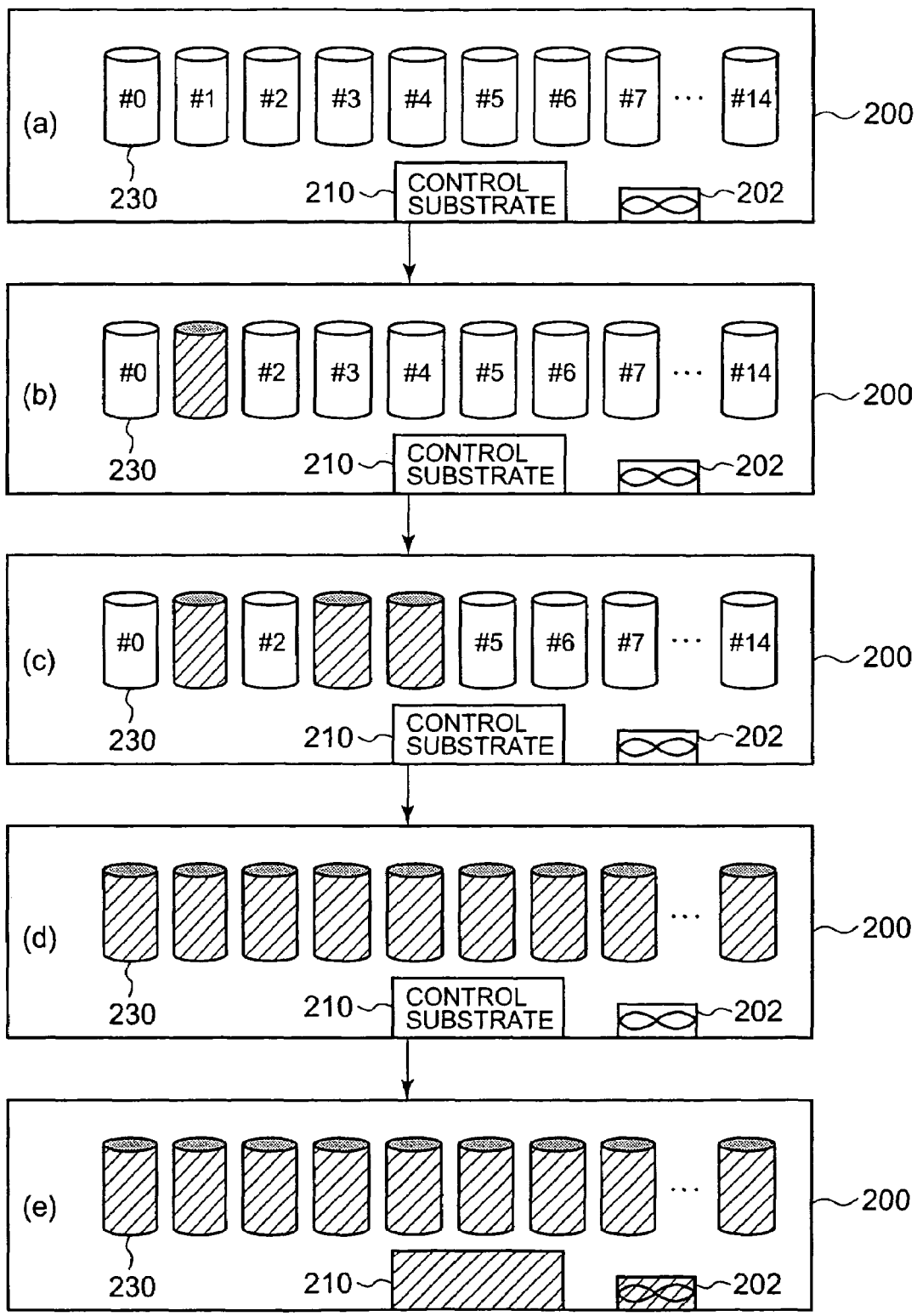
FIG. 23 is an explanatory diagram that shows an aspect in which power conservation mode changes stepwise in accordance with the usage state of the disk drive.

FIG. 23 schematically shows changes in the power conservation mode of each additional enclosure 200. As shown in FIG. 23A, a DC current is first supplied from the power supply section 220 to each of the disk drives 230, the control substrate 210, and the cooling fan 202. As shown in FIG. 23B, the disk drives 230 (#1) that have not been accessed for a predetermined time are changed to the spindown state.

When there is an increase in the disk drives 230 in the spindown state as shown in FIG. 23C and when all the disk drives 230 change to the spindown state as shown in FIG. 23D, the supply of external power from the PDB300 to the additional enclosure 200 stops as shown in FIG. 23E. Thus, in this embodiment, the amount of electricity consumed can be reduced stepwise in accordance with the usage states of the disk drives 230 and, ultimately, the amount of electricity consumed can be reduced to zero.

Figure 24:
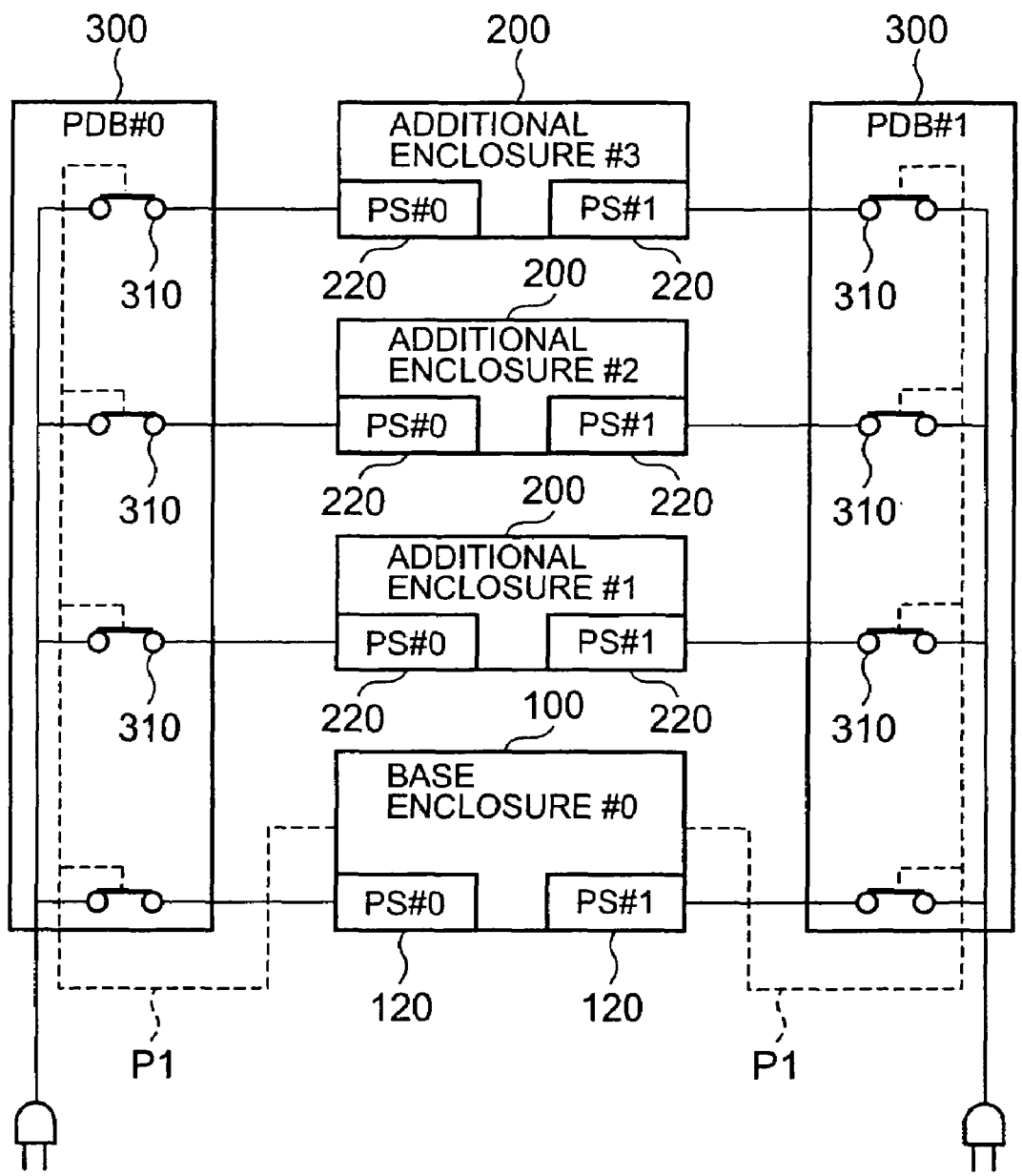
FIG. 24 is an explanatory diagram that shows an aspect in which the states of the respective switches of PDBs change.

FIGS. 24 to 27 are explanatory diagrams showing the order of stoppage of the supply of external power to the additional enclosures 200. As shown in FIG. 24, when data access is made to any one or more of the disk drives 230 in the respective additional enclosures 200, the switches 310 in the respective PDB300 each enter an ON state. Hence, external power is supplied to the respective additional enclosures 200.

Figure 25:
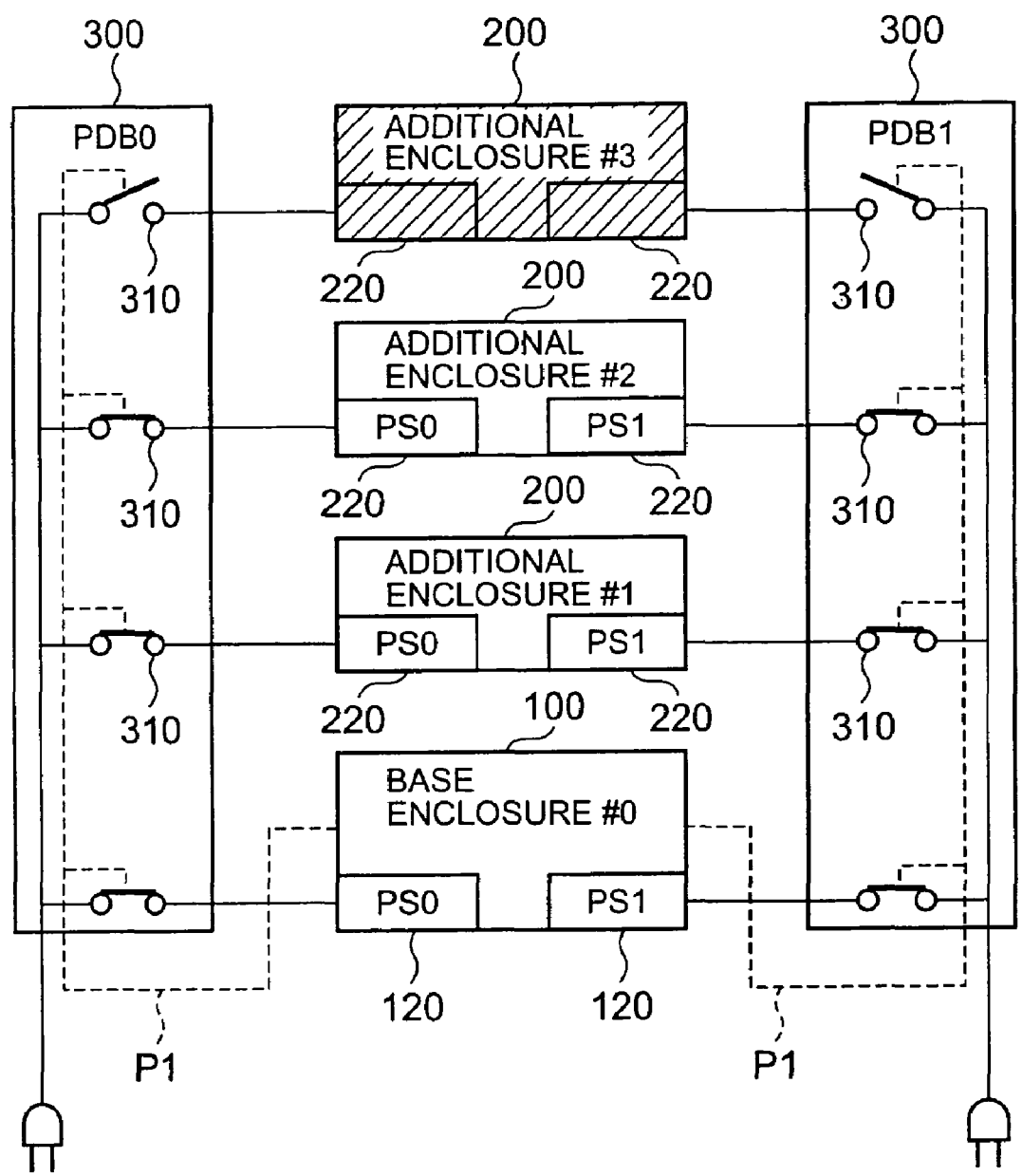
FIG. 25 is an explanatory diagram that is a continuation of FIG. 24.

As shown in FIG. 25, because, in the case of the additional enclosure 200 (#3) that stores the data with the lowest usage frequency, data access to the respective disk drives 230 in the additional enclosure 200 (#3) does not readily occur, the supply of external power to the enclosure is stopped in a relatively short time.

Figure 26:
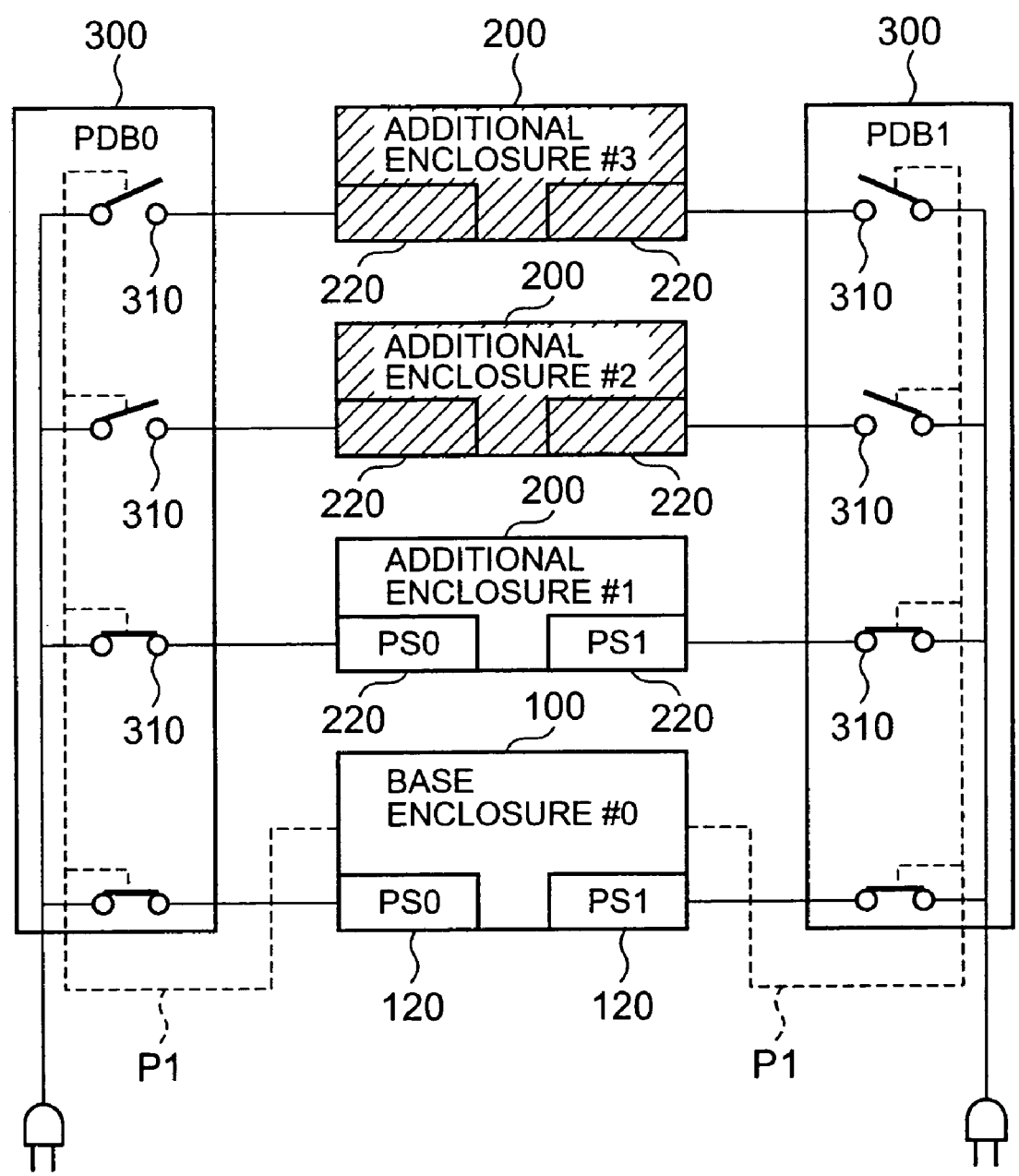
FIG. 26 is an explanatory diagram that is a continuation of FIG. 25.

As shown in FIG. 26, so too with the additional enclosure 200 (#2) that stores data with the next lowest usage frequency, data access is interrupted after additional enclosure 200 (#3) and all the disk drives 230 enter a spindown state. At this point, the lower additional enclosure 200 (#3) has already had its power supply stopped. Therefore, power to the additional enclosure 200 (#2) can also be stopped.

Figure 27:
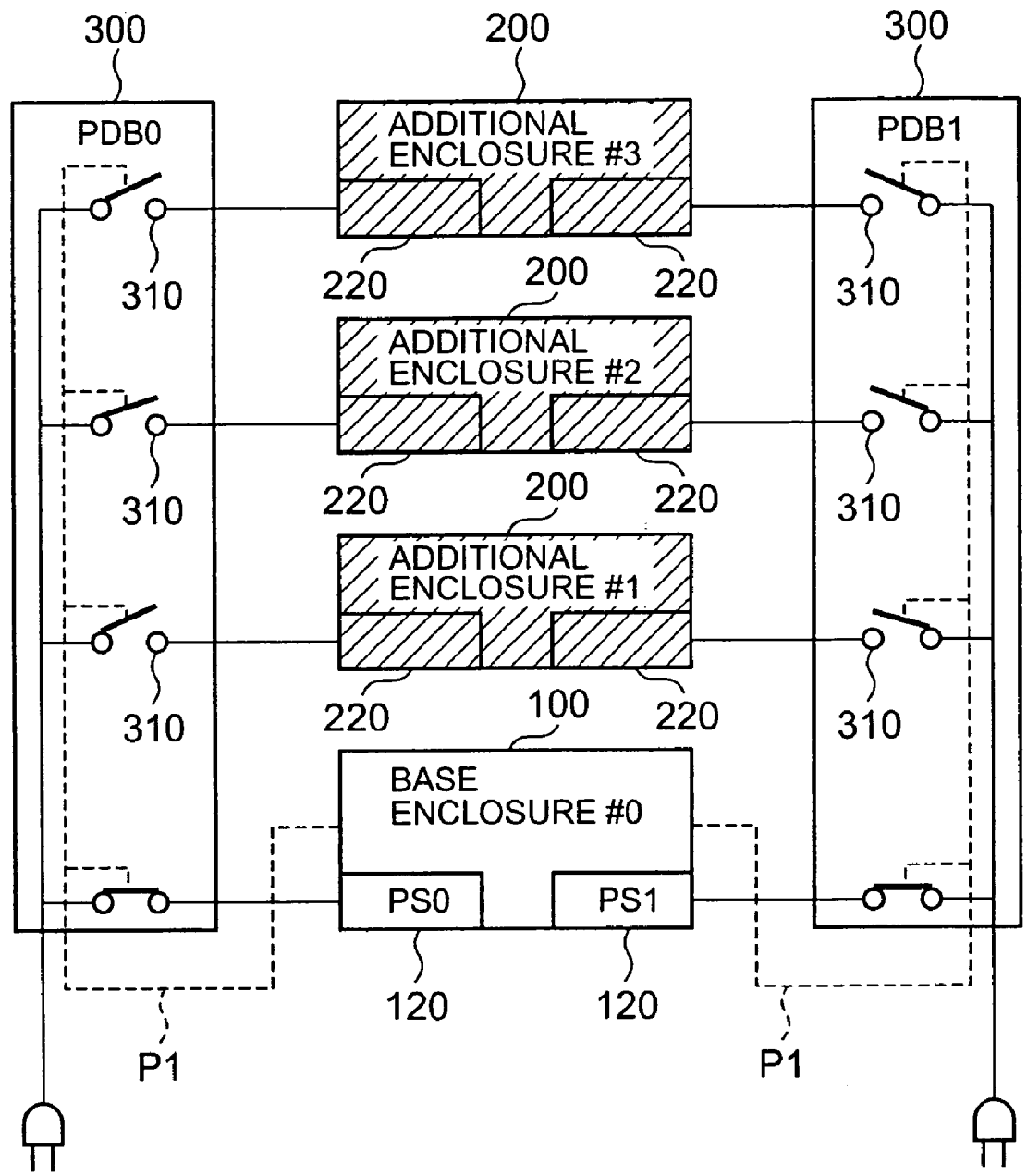
FIG. 27 is an explanatory diagram that is a continuation of FIG. 26.

As shown in FIG. 27, when the data access to the respective disk drives 230 in the additional enclosure 200 (#1) is interrupted for a predetermined time or more, the respective disk drives 230 in the additional enclosure 200 (#1) each enter a spindown state. At this point, because power to the lower additional enclosure 200 (#2 and #3) has stopped, the supply of external power to the additional enclosure 200 (#1) is also stopped.

Due to the effects of this embodiment that is so constituted, because the supply of external power to the respective additional enclosures 200 is stopped in accordance with the usage condition of the disk drive 230, the amount of power consumed can be reduced below that of the prior art. Further effects obtained from the constitution of this embodiment have already been mentioned earlier.

Second Embodiment

The second embodiment of the present invention will now be described on the basis of FIG. 28. Each of the following embodiments including this embodiment corresponds to a modified example of the first embodiment. In this embodiment, power supply start processing is executed only when access to the access destination drive has not been possible.

Figure 28:
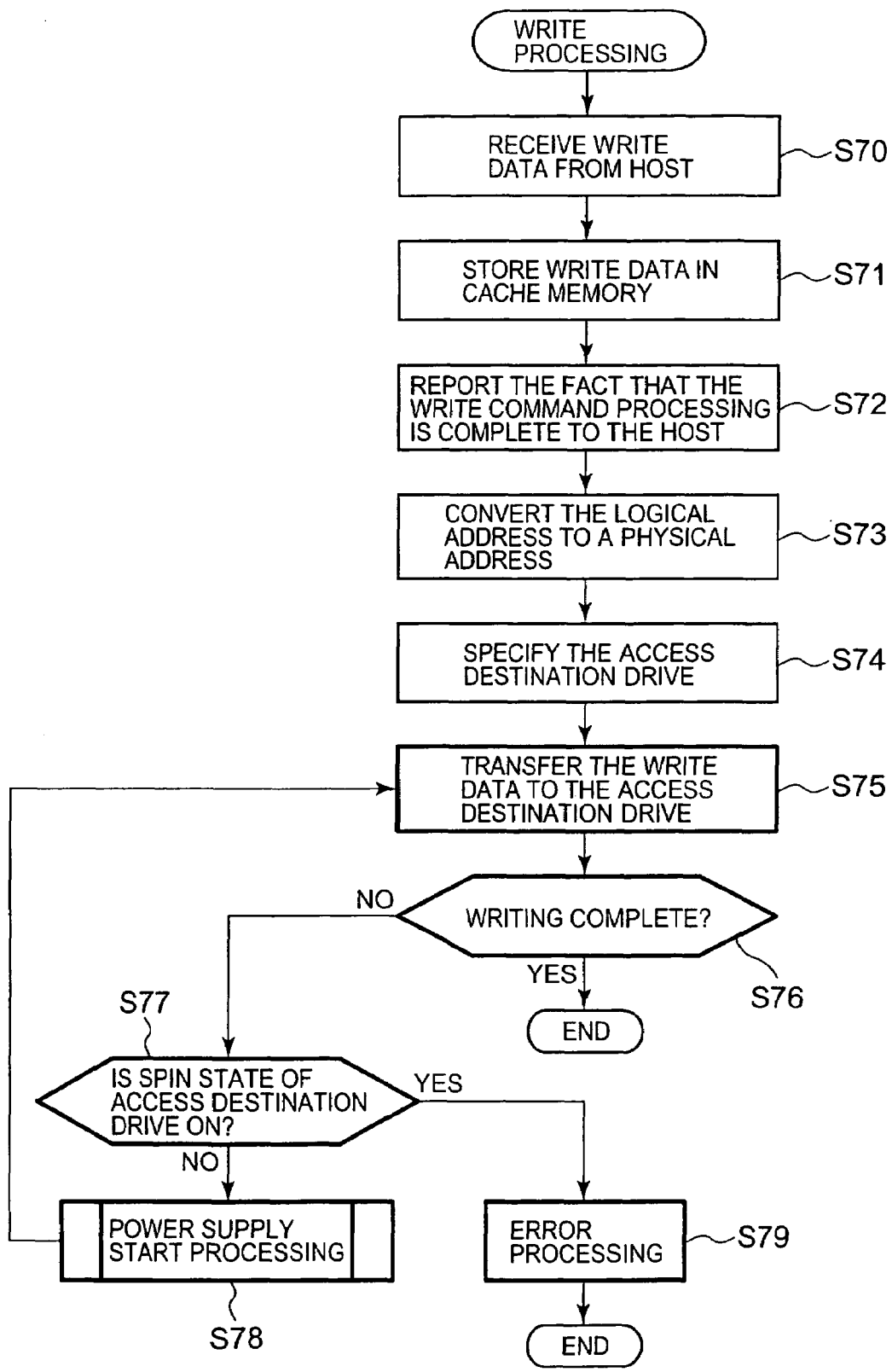
FIG. 28 is a flowchart that shows the write processing according to the second embodiment.

FIG. 28 is a flowchart of write processing that is executed by the controller 110 of the storage control device of this embodiment. In this flowchart, S70 to S74 correspond to S40 to S44 shown in FIG. 19. Hence, repetitive description is omitted and the description will be provided with an emphasis on the characteristics of this embodiment.

When the access destination drive is specified (S74), the controller 110 transfers write data to the additional enclosure 200 that comprises the access destination drive (S75). When it has been checked that the writing of the write data have been completed normally (S76:YES), the controller 110 ends the processing.

When the writing of the write data to the access destination drive has not ended normally (S76:NO), the controller 110 judges whether the access destination drive is in the spinup state by using Table T2 (S77).

When it is judged that the access destination drive is in the spindown state (S77:NO), the controller 110 executes power supply start processing (S100). When write data have not been written despite that fact that the access destination drive is in the spinup state (S77:YES), the controller 110 executes error processing (S79). In the error processing, for example, a predetermined error message is displayed on the management terminal 14.

The embodiment constituted in this manner exhibits the same effects as those of the first embodiment.

Third embodiment

Figure 29:
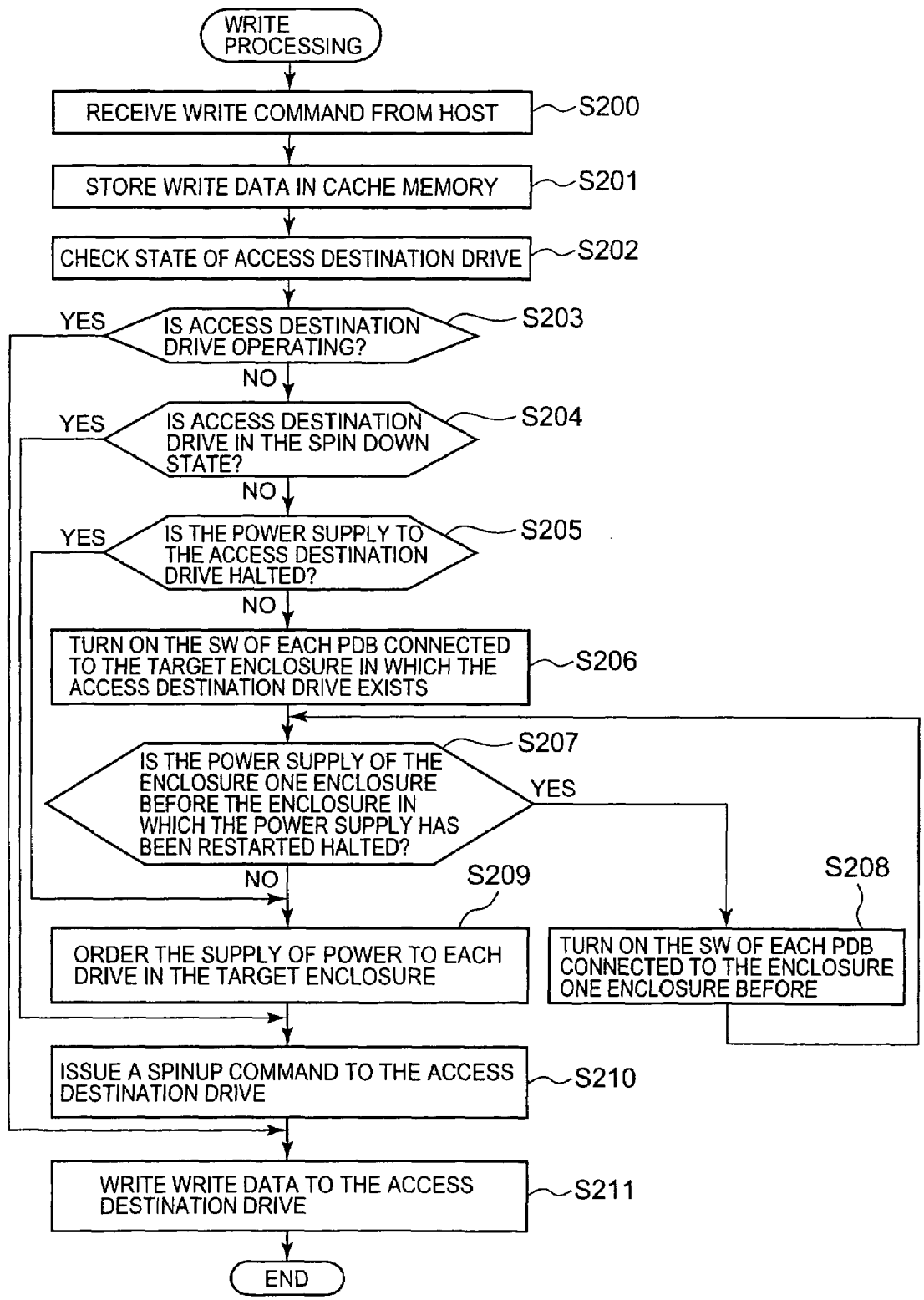
FIG. 29 is a flowchart that shows write processing and power supply start processing according to a third embodiment.

The third embodiment will be described on the basis of FIG. 29. In this embodiment, the write processing and power supply start processing shown in FIG. 19 are represented in the same flowchart.

Upon receipt of the write command from the host 13 (S200), the controller 110 stores the write data in the cache memory 114 (S201) and reports the end of processing to the host 13. The controller 110 checks the state of the access destination drive by using Table T2 (S202) and judges whether the access destination drive is running (S203).

When the access destination drive is operating (S203: YES), the processing moves to S211. When the access destination drive is not operating (S203:NO), the controller 110 judges whether the access destination drive is in the spindown state (S204). When the access destination drive is in the spindown state (S204:YES), the processing moves to S210.

When the access destination drive is not in the spindown state (S204:NO), the controller 110 judges whether the supply of power from the power supply section 220 to the access destination drive has stopped (S205). When DC power is being supplied by the power supply section 220 to each disk drive 230 (S205:YES), the processing moves to S209.

When the output of the DC power from the power supply section 220 has not stopped (S205:NO), the controller 110 turns ON the switches 310 in the respective PDB300 connected to the target enclosure that comprises the access destination drive (S206). The controller 110 judges whether the supply of power to the additional enclosure 200 adjacent to the target enclosure is stopped (S207).

When the power supply to the adjacent upper additional enclosure 200 has stopped (S207:YES), the controller 110 supplies external power by turning ON each of the switches 310 connected to the upper additional enclosures 200 (S208) By repeating S207 and S208, external power is supplied sequentially to the respective additional enclosures 200 between the base enclosure 100 and the target enclosure that comprises the access destination drive, whereby the transmission path is formed.

When the power supply to the adjacent upper additional enclosure 200 has not stopped (S207:NO), the controller 110 issues an instruction to the control substrate 210 to supply DC power from the power supply section 220 to the respective disk drives 230 in the target enclosure (S209).

Thereafter, the controller 110 issues a spinup command for spinning up the access destination drive (S210) and transfers the write data to the access destination drive for storage therein (S211).

This embodiment, which is so constituted, exhibits the same effects as those of the first embodiment.

Fourth Embodiment

The fourth embodiment will now be described on the basis of FIGS. 30 to 32. In this embodiment, in a storage system comprising a plurality of storage control devices, one storage control device 1000 virtualizes the storage regions of the other storage control devices 1100 and 1200 and supplies these storage regions to the host 13.

Figure 30:
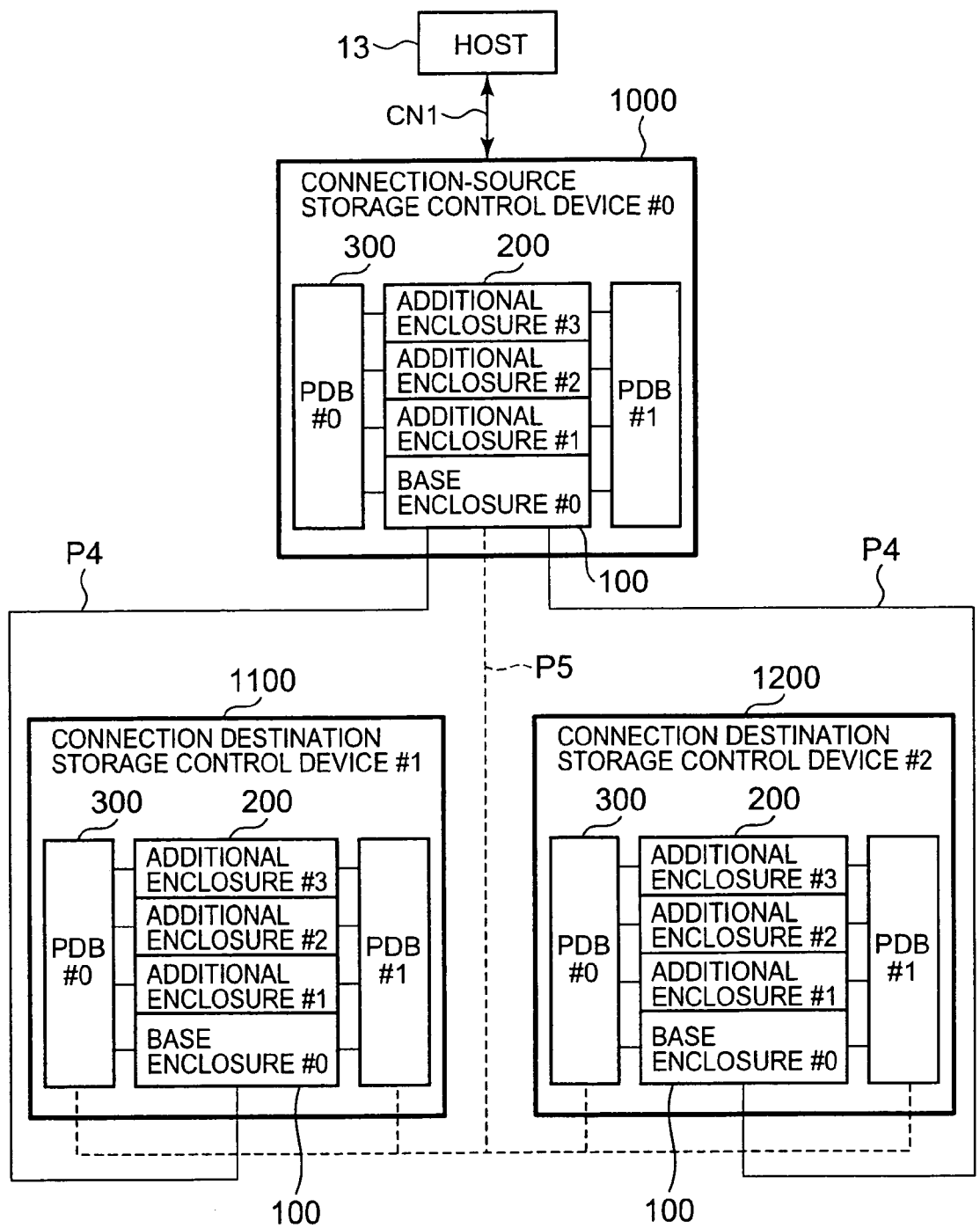
FIG. 30 is an explanatory diagram that shows the overall constitution of the storage system in which the storage control device according to the fourth embodiment is employed.

The storage system shown in FIG. 30 comprises a plurality of storage control devices 1000, 1100, and 1200. The storage control device 1000 is a connection-source storage control device that is connected to the respective other storage control devices 1100 and 1200 and manages the respective other storage control devices 1100 and 1200.

The connection-source storage control device 1000 virtualizes the storage regions of the connection-source storage control devices 1100 and 1200 inside the storage control device 1000 and supplies the storage regions to the host 13 as if they were internal volumes of the storage control device 1000. Hence, the connection source storage control device 1000 centrally manages information relating to the system constitution of the respective storage control devices 1000, 1100, and 1200.

The respective storage control devices 1000, 1100 and 1200 can also be constituted comprising the same basic structure or may each comprise a different structure. In this embodiment, the storage control devices 1000, 1100, and 1200 are each provided with a structure such as that described in the first embodiment.

The base enclosure 100 of the connection-source storage control device 1000 and the base enclosures 100 of the connection-destination storage control devices 1100 and 1200 are connected via a communication path P4. This communication path P4 can be constituted as a communication network such as a SAN, for example. Furthermore, the base enclosure 100 of the connection-source storage control device 1000 is connected via a signal wire P5 to the respective PDB300 of the connection-destination storage control devices 1100 and 1200.

Figure 31:
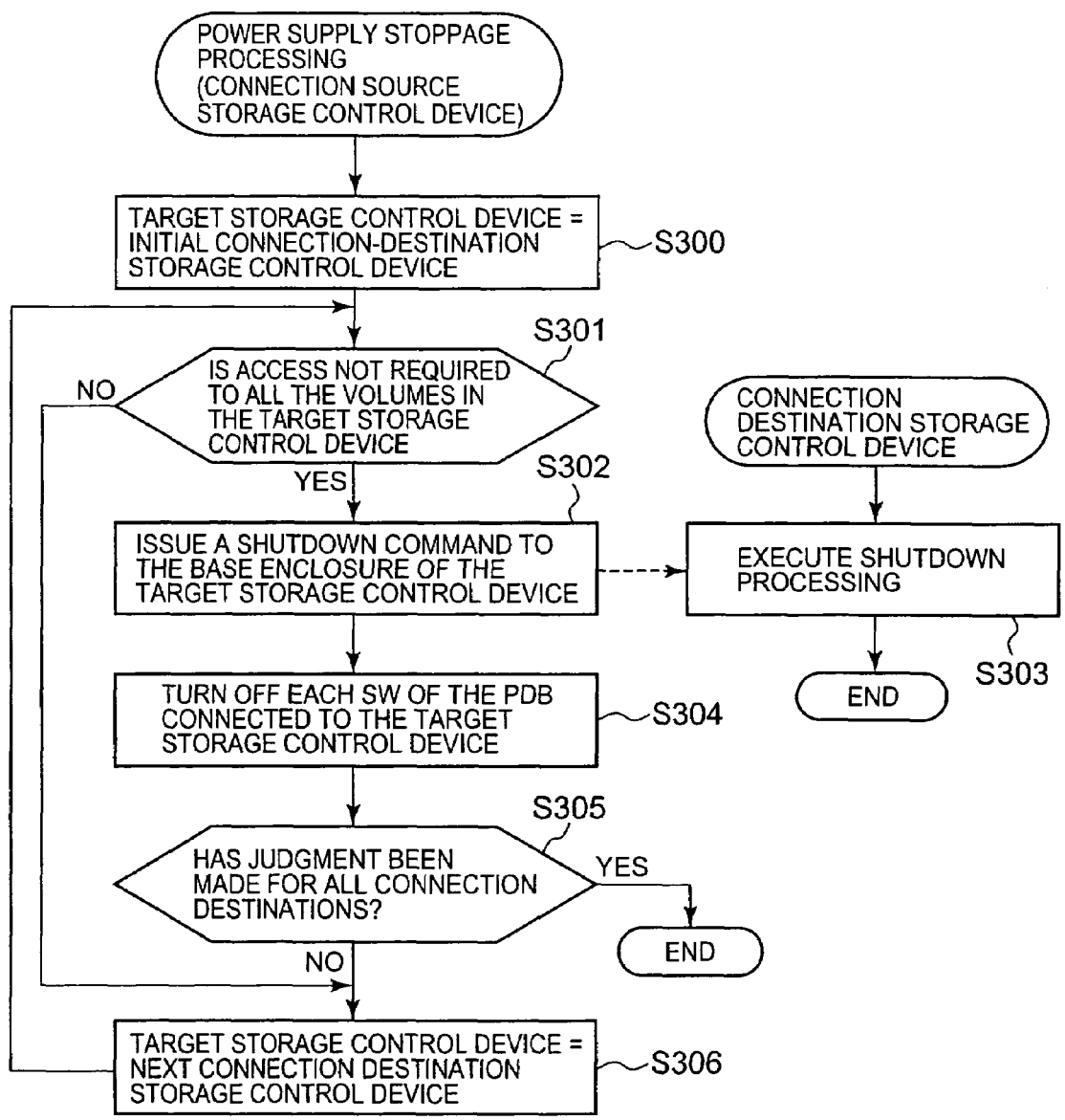
FIG. 31 is a flowchart that shows processing to stop the power supply in storage control device units.

FIG. 31 is a flowchart showing the power supply stoppage processing of this embodiment. This processing is executed by the controller 110 in the base enclosure 100 of the connection-source storage control device 1000.

The connection-source controller 110 selects the storage control device 1100 with the smallest device number as the processing-target storage control device (S300). The controller 110 judges whether access to all the volumes 250 of the target storage control device 1100 is unnecessary (S301).

When it is judged that access to all the volumes 250 of the storage control device 1100 is unnecessary (S301:YES), the connection-source controller 110 issues a shutdown command to the base enclosure 100 of the storage control device 1100 (S302).

The controller 110 of the storage control device 1100 that received the shutdown command executes the shutdown processing (S303). In the shutdown processing, for example, the supply of power sequentially from the lower additional enclosure 200 is stopped and the operation of the base enclosure 100 is also finally stopped.

The connection-source controller 110 sequentially turns off the respective switches 310 in the respective PDB300 connected to the storage control device 1100 starting from the bottom (S304). As a result, the supply of external power to the base enclosure 100 and to the additional enclosures 200 of the connection-destination storage control device 1100 is stopped.

The connection-source controller 110 judges whether all the connection-destination storage control devices have been judged (S305). When an unjudged storage control device exists (S305:NO), the controller 110 changes the device number of the target storage control device to the device number of the next connection destination storage control device 1200 (S306) and repeats S301 to S305.

Figure 32:
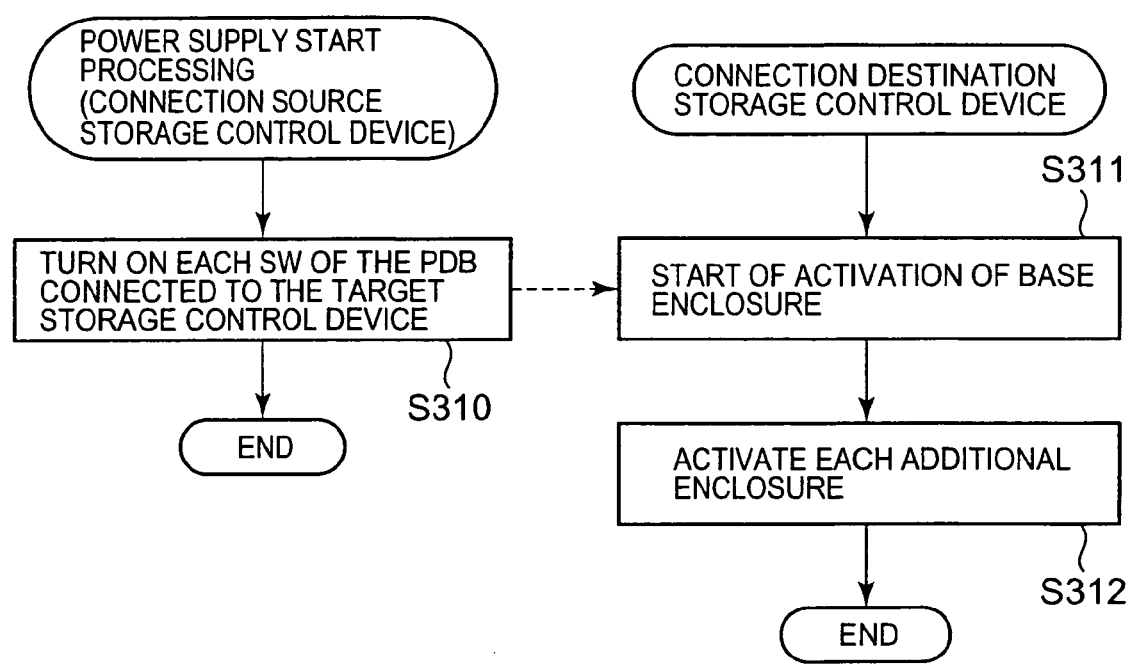
FIG. 32 is a flowchart that shows processing to restart the power supply in storage control device units.

FIG. 32 is a flowchart showing processing in a case where the power supply is started. The connection-source controller 110 sequentially turns ON the respective switches 310 of the respective PDB300 connected to the target storage control device starting from the top (S310).

When external power is supplied from the PDB300 of each system in the connection-destination storage control device, the base enclosure 100 is first activated (S311) and then the respective additional enclosures 200 are activated in the order in which the external power is supplied (S312).

This embodiment, which is so constituted, also exhibits the same effects as those of the first embodiment. In addition, in this embodiment, the amount of power consumed can be reduced still further in a storage system that comprises a plurality of storage control devices 1000, 1100 and 1200.

Fifth Embodiment

Figure 33:
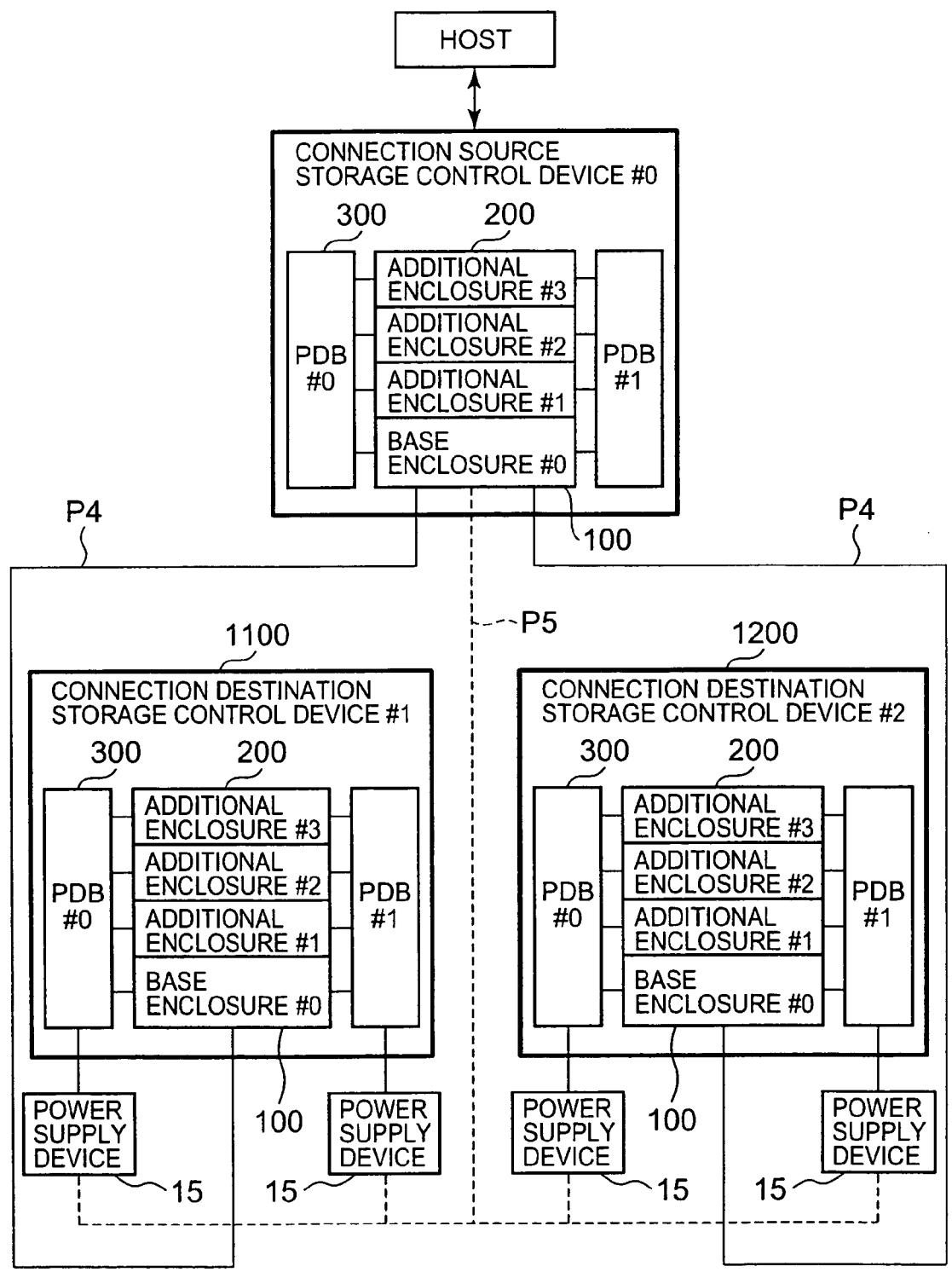
FIG. 33 is an explanatory diagram that shows the overall constitution of the storage system in which the storage control device according to the fifth embodiment is employed.

FIG. 33 is an explanatory diagram that shows a storage system according to a fifth embodiment. In this embodiment, the operation of the power supply device 15 that supplies power to the respective PDB300 of the respective connection-destination storage control devices 1100 and 1200 is controlled by the base enclosure 100 of the connection-source storage control device 1000.

This embodiment, which is so constituted, also exhibits the same effects as those of the fourth embodiment.

Moreover, the present invention is not limited to the above embodiments. Rather, a person skilled in the art is able to make a variety of additions and modifications and so forth within the scope of the present invention. For example, the respective embodiments can be suitably combined.

What is claimed is:

1. A storage control device, comprising:
  a first enclosure for controlling data communications to and from an upper level device; and a
  second enclosure including a plurality of storage devices and coupled to the first enclosure;
  wherein the first enclosure shifts a state of a storage device that is included in a plurality of the storage devices in the second enclosure and has not been accessed for a time equal to or more than a predetermined time to a power save mode,
  wherein when all of the storage devices included in the second enclosure is shifted to the power saving mode, the first enclosure stops power supply to the second enclosure.

2. The storage control device according to claim 1, further comprising:
  a third enclosure including a plurality of storage device and coupled to the first enclosure,
  wherein the first enclosure shifts a state of a storage device that is included in a plurality of the storage devices in the third enclosure and has not been accessed for a predetermined time or more to a power saving mode,
  wherein when all of a plurality of the storage devices included in the third enclosure are shifted to the power saving mode, the first enclosure stops power supply to the third enclosure,
  wherein the first enclosure holds first information for managing the constitution of the storage control device and a state of power supply, and
  wherein the first enclosure controls supply or stoppage of power individually to the second enclosure and the third enclosure by referring to the system constitution information.

3. The storage control device according to claim 1, wherein when all of a plurality of the storage device included in the second enclosure are shifted to the power saving mode, the first enclosure stops power supply to all of the plurality of the storage devices in the second enclosure before stopping power supply to the second enclosure.

4. The storage control device according to claim 1, wherein the first enclosure stops power supply to the second enclosure after stopping power supply to all of a plurality of the storage devices in the second enclosure.

5. The storage control device according to claim 1, further comprising:
  a third enclosure including a plurality of storage device and coupled to the first enclosure;
  wherein the first enclosure coupled to the second enclosures and the third enclosure by daisy chain connection and the third enclosure located downstream of a daisy chain connection of the second enclosure; and
  wherein after stopping power supply to all of a plurality of the storage devices in the second enclosure, when the first enclosure judges that power supply to the third enclosure is stopped, the first enclosure stops power supply to the second enclosure.

6. The storage control device according to claim 5, wherein the first enclosure migrates data stored in the second enclosure and whose usage frequency by the upper level device is equal to or less than a predetermined value from the second enclosure to the third enclosure.

7. The storage control device according to claim 5, wherein a physical distance of the daisy-chain connection between the first enclosure and the second enclosure is shorter than a physical distance of a daisy-chain connection between the first enclosure and the third enclosure, wherein a plurality of the storage device included in the second enclosure has higher performance than a plurality of the storage device included in the third enclosure.

8. The storage control device according to claim 1, wherein the first enclosure is coupled to the second enclosures by a daisy chain connection, and the first enclosure stops power supply to other functions other than functions required for the second enclosure to transmit a signal when the transmission of a signal to the second enclosure is required, after stopping power supply to all of a plurality of the storage devices in the second enclosure.

9. The storage control device according to claim 1, wherein, when power is supplied to the second enclosures and the third enclosure for each of which power supply has stopped, the first enclosure supplies power with a time difference to the second enclosure and the third enclosure.

10. The storage control device according to claim 1, wherein the first enclosure diagnoses whether the second enclosures for which power supply, has been stopped are working properly by supplying power at regular or irregular intervals to the second enclosures.

11. The storage control device according to claim 1, wherein
  the first enclosure and the respective second enclosures are connected by means of a daisy chain connection, and
  the first control section is capable of executing each of:
  (1) a first mode in which storage devices among the respective storage devices that have not been accessed for a preset predetermined time or more are shifted to a power conservation mode that suppresses power consumption;
  (2) a second mode in which, when a predetermined second enclosure among the respective second enclosures for which all the storage devices in the enclosure have shifted to the power conservation mode is detected, the supply of power to all of the storage devices in the predetermined second enclosure is stopped; and (3) a third mode in which the supply of power to the predetermined second enclosure is stopped after stopping the supply of power to all of the storage devices in the predetermined second enclosure.

12. A storage control device that comprises a plurality of enclosures, comprising:

a first enclosure;

second enclosures each comprising a plurality of storage devices; and a power supply circuit section for supplying external power to the first enclosure and to each of the second enclosures respectively, wherein the first enclosure at least comprises:

a system constitution information management section that manages system constitution information relating to the constitution of the storage control device and to a power supply state;

a first control section that processes the power supply to each of the second enclosures and data inputs and outputs between a higher level device and each of the storage devices on the basis of the system constitution information managed by the system constitution information management section; and a first enclosure internal power supply section that supplies predetermined power to the first control section by converting the external power supply supplied via the power supply circuit section into a predetermined voltage; and wherein each of the second enclosures at least comprises:

a plurality of the storage devices that store data used by the higher level device;

a second control section that controls the data inputs and outputs with respect to the respective storage devices and the operation of the second enclosure power supply section in accordance with an instruction from the first control section; and a second enclosure internal power supply section that supplies power to the respective storage devices and the second control section by converting the external power supply supplied via the power supply circuit section into a predetermined voltage, and wherein the power supply circuit section comprises switch sections that are each provided midway along a power supply path between at least the respective second enclosure internal power supply section and the external power supply, the switch sections being made to control each of the power supply paths in accordance with the instruction from the first control section; and the first control section controls the second control section of each of the second enclosures to shift a state of a storage device among the plurality of storage devices in each of the second enclosures that has not been accessed for a time equal to or more than a predetermined time to a power saving mode, and the first control section controls the second control section of each of the second enclosures to stop power supply to a second enclosure having all of the plurality of storage devices therein shifted to the power saving mode.

* * * * *

UNITED STATES PATENT AND TRADEMARK OFFICE
CERTIFICATE OF CORRECTION

PATENT NO. : 7,639,493 B2  Page 1 of 1
APPLICATION NO. : 11/605395
DATED : December 29, 2009
INVENTOR(S) : Hori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 321 days.

Signed and Sealed this

Ninth Day of November, 2010

David J. Kappos
*Director of the United States Patent and Trademark Office*